(12) United States Patent
Furuyama et al.

(10) Patent No.: US 6,661,966 B1
(45) Date of Patent: Dec. 9, 2003

(54) REPRODUCING APPARATUS, COMPUTER-READABLE STORAGE MEDIUM AND METHOD FOR DISPLAYING INFORMATION CORRESPONDING TO AN AREA

(75) Inventors: Hiroaki Furuyama, Tachikawa (JP); Kurumi Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/268,386

(22) Filed: Mar. 15, 1999

(30) Foreign Application Priority Data

Mar. 23, 1998 (JP) .......................................... 10-074010
Jul. 30, 1998 (JP) .......................................... 10-228541

(51) Int. Cl.$^7$ ............................. H04N 5/91; H04N 5/95
(52) U.S. Cl. .......................................... 386/65; 386/85
(58) Field of Search ................... 386/1, 13, 46, 386/85, 65; 348/231.5, 231.3

(56) References Cited

U.S. PATENT DOCUMENTS

| | | | | |
|---|---|---|---|---|
| 4,274,151 A | * | 6/1981 | Kamiwaki | 368/21 |
| 5,296,884 A | * | 3/1994 | Honda et al. | 396/311 |
| 5,506,644 A | * | 4/1996 | Suzuki et al. | 396/310 |
| 5,724,316 A | * | 3/1998 | Brunts | 340/988 |
| 5,793,304 A | * | 8/1998 | Sone | 340/7.55 |
| 5,812,205 A | * | 9/1998 | Milnes et al. | 348/460 |
| 6,181,878 B1 | * | 1/2001 | Honda | 342/357.09 |
| 6,223,347 B1 | * | 4/2001 | Watanabe et al. | 725/139 |
| 6,240,240 B1 | * | 5/2001 | Nagano et al. | 386/83 |

* cited by examiner

*Primary Examiner*—Thai Tran
*Assistant Examiner*—Polin Chieu
(74) *Attorney, Agent, or Firm*—Robin, Blecker & Daley

(57) ABSTRACT

When, after moving to an area having a time difference, a camera-integrated recording-and-reproducing apparatus has been used for taking a video image and recording the taken video image together with date and time information without performing a time-difference correction on an internal clock, date and time information which has been corrected in time difference can be displayed at the time of reproduction of the video image. More specifically, date and time data as reproduced is corrected in time difference on the basis of time-difference correction information corresponding to an area beforehand inputted by a key operation, and the time-difference-corrected date and time data is displayed while being superimposed on the reproduced video image.

22 Claims, 23 Drawing Sheets

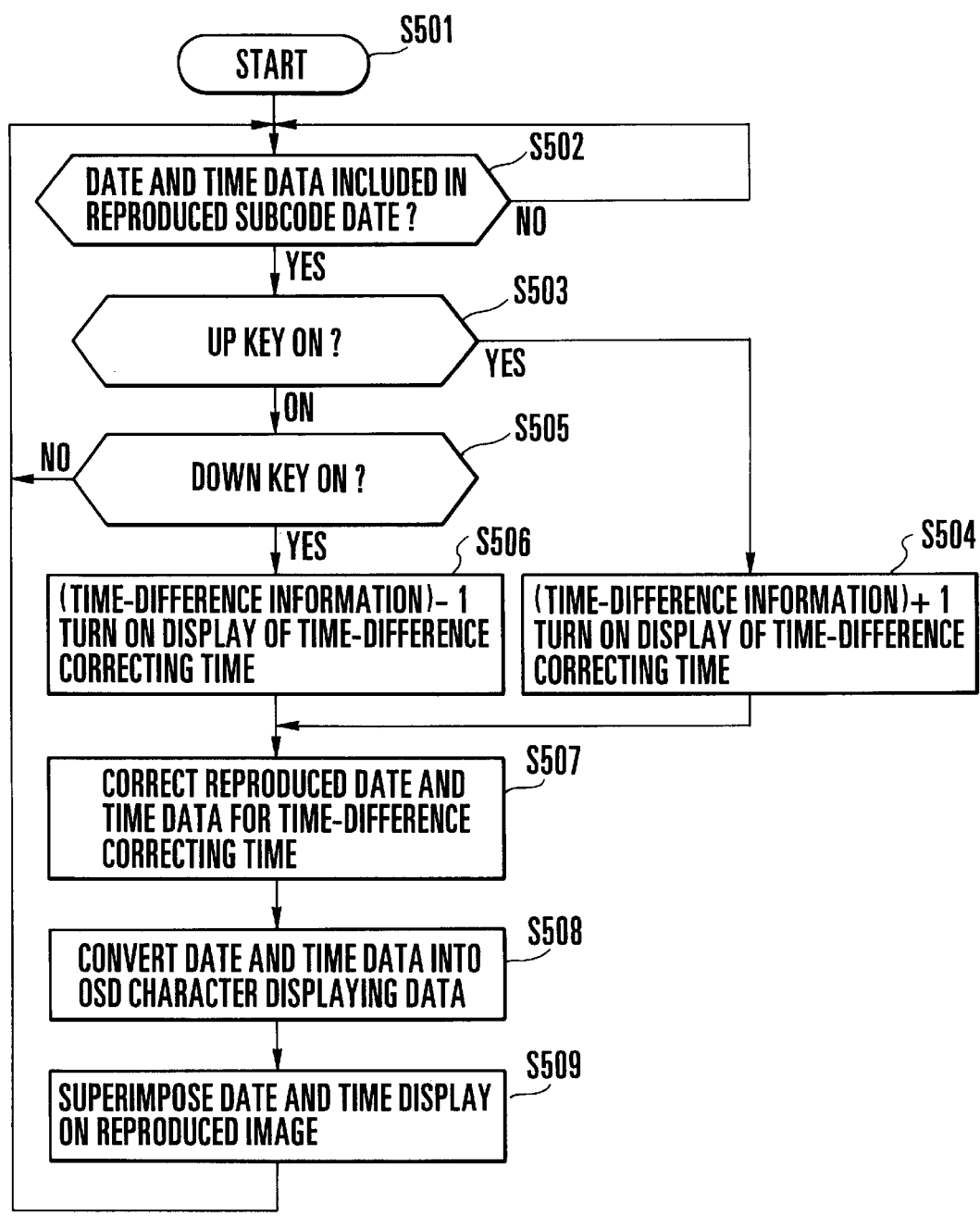

DISPLAY OF TIME-DIFFERENCE CORRECTING TIME

FIG.13(a)

```
1998.03.18 TOKYO

```
SET AREA LONDON
   Paris           △

Not Display    ▽
```

FIG.13(c)

```
1998.03.18
 LONDON
 04 : 14 : 36
```

FIG.13(d)

```
1998.03.18 LONDON

FIG.18(a)
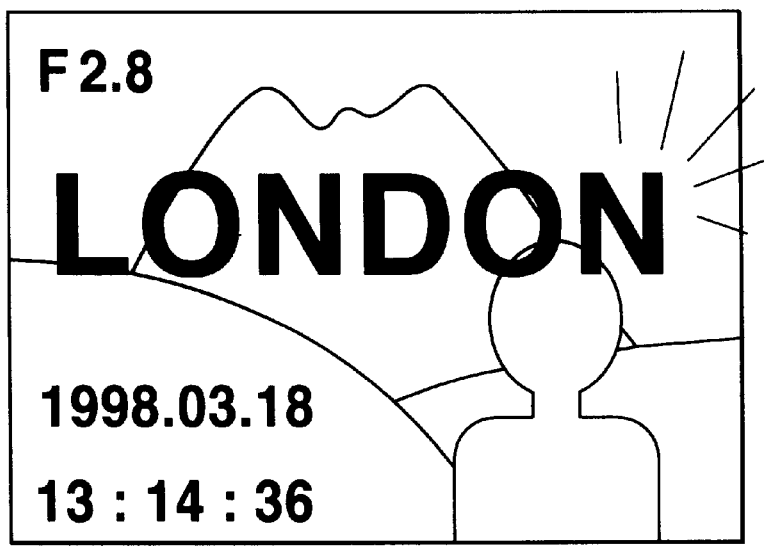
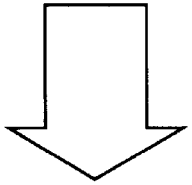
FIG.18(b)
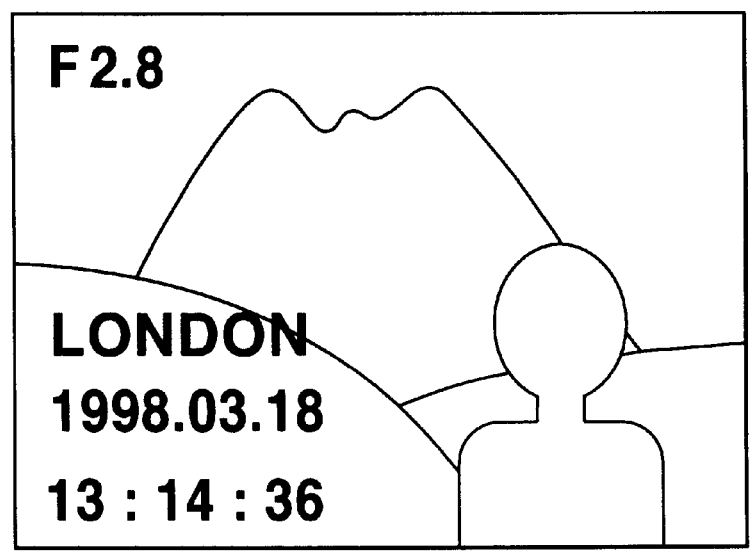

FIG. 21

| To : Beenz |
| Subject : Letter |
| Hello!! How are you ?<br>I'm fine now, but I have some...... |

FIG. 22

| NEW Mails are Delivered !! | | | | |
|---|---|---|---|---|
| | Address | Subject | Date | Area |
| NEW | forest | Letter | 1998/3/15 15:15 | TOKYO |
| NEW | Woods | Re : Hello | 1998/3/15 16:48 | LONDON |
| Opened | Nut | Re : No.1 Projects | 1998/3/14 9:48 | PARIS |
| | | | | |
| | | | | |
| | | | | |

FIG. 23(a)

from TOKYO !!

FIG. 23(b)

From : forest
Date : Sun, 15 March 1998 15:15:57
AREA: TOKYO
Subject: Letter

Hello!! How are you ?
I'm fine now, but I have some ........

FIG. 23(c)

From : forest
Date : Sun, 15 March 1998 15:15:57
( Sun, 15 March 1998 23:15:57
in TOKYO )
Subject: Letter Hello!! How are you ?
I'm fine now, but I have some ........

FIG. 23(d)

From : Woods
Date : Sun, 15 March 1998 16:48:14
To: Beenz
Subject: Re: Hello

Thanks for your friendly mail !!
I'm glad to know now you get ........

FIG.26(a)

| DIRECTORY INFORMATION |
| --- |
| AREA SETTING MODULE |
| AREA DETERMINING MODULE |
| SPECIAL DISPLAY MODULE |
| ･･････････ |

FIG.26(b)

| DIRECTORY INFORMATION |
| --- |
| INFORMATION READING MODULE |
| TIME-DIFFERENCE INFORMATION ACQUIRING MODULE |
| SPECIAL DISPLAY MODULE |
| ･･････････ |

FIG.26(c)

| DIRECTORY INFORMATION |
| --- |
| RECEIVING MODULE |
| INFORMATION READING MODULE |
| TIME-DIFFERENCE INFORMATION ACQUIRING MODULE |
| CORRECTION MODULE |
| SPECIAL DISPLAY MODULE |
| ･･････ |

REPRODUCING APPARATUS, COMPUTER-READABLE STORAGE MEDIUM AND METHOD FOR DISPLAYING INFORMATION CORRESPONDING TO AN AREA

BACKGROUND OF THE INVENTION

1. Field of the Invention

The present invention relates to an image reproducing apparatus, an image recording-and-reproducing apparatus and a computer-readable storage medium, which are adapted for use in recording and reproducing, on and from a recording medium, information on date and time of image-taking by means of an internal clock, together with a video signal.

2. Description of Related Art

Heretofore, as a method of correcting a time difference in date and time in a case where an image-taking operation is performed after the operator moves to an area causing the time difference, there have been a method of re-setting date and time themselves serving as a standard to date and time of a local area, a method of correcting date and time by using a world clock faculty or the like, before a recording operation is performed, a method of correcting date and time on the basis of position and time information obtained by a GPS (global positioning system) receiving apparatus, before a recording operation is performed, a method of recording position and time information as it is and, then, correcting date and time on the basis of the position and time information at the time of reproduction, etc. In any of the above-mentioned mathods, date and time data is corrected at the time of a recording operation, or information data required for correcting date and time data is recorded together with a video signal at the time of a recording operation.

Further, heretofore, as a method of causing the standard date and time subjected to time-difference correction to return from the time-difference-corrected state to an original, un-corrected, state, there have been a method of operating a menu faculty, a method of succesively operating return keys, and a method of operating a single key a plurality of times.

However, in the above conventional methods, it is necessary to always re-set the clock to date and time of a local area before an image-taking operation, or it is necessary to perform a time-difference correcting operation by using the conventional world clock faculty, which is very troublesome for the operator. Further, in the above conventional methods, when having come back from an area having a time difference to an area having no time difference, the operator has to return the date and time which were set once or the time-difference correction which was performed by using the world clock faculty to an original state thereof by performing the same plurality of times of key operations as in setting the date and time, which is also troublesome for the operator. Furthermore, the addition of an automatic time-difference correcting function using the GPS receiving apparatus to an image recording-and-reproducing apparatus is a large-scaled method and, therefore, causes the whole system to become complicated and large-sized, so that there is such a fatal problem that the system becomes highly expensive.

BRIEF SUMMARY OF THE INVENTION

It is, accordingly, an object of the invention to enable a time-difference correction to be performed at the time of reproduction and to enable the return from a time-difference-corrected state to an original, uncorrected state to be performed by one operation of one key.

Further, it is another object of the invention to provide an electronic apparatus, a time displaying method and a storage medium, each of which enables a recognition ratio in area information for the operator to be improved.

To attain at least one of the above objects, in accordance with one aspect of the invention, there is provided a reproducing apparatus, which comprises reproduction means for reproducing a signal from a recording medium to output the reproduced signal, extraction means for extracting clock data included in the reproduced signal, input means for inputting correction information for performing a time-difference correction, and correction means for performing the time-difference correction on the extracted clock data on the basis of the inputted correction information.

In accordance with anther aspect of the invention, there is provided a video camera, which comprises image pickup means for picking up an object image to output a video signal, clock means for generating clock data, recording and reproducing means for recording both the video signal and the clock data on a recording medium and for reproducing a signal from the recording medium, extraction means for extracting the clock data from the signal reproduced from the recording medium, input means for inputting correction information for performing a time-difference correction, and correction means for performing the time-difference correction on the extracted clock data on the basis of the inputted correction information.

In accordance with a further aspect of the invention, there is provided a computer-readable storage medium which stores therein a program for executing a processing which comprises a reproduction process of reproducing a signal from a recording medium to output the reproduced signal, an extraction process of extracting clock data included in the reproduced signal, an input process of inputting correction information for performing a time-difference correction, and a correction process of performing the time-difference correction on the extracted clock data on the basis of the inputted correction information.

In accordance with a further aspect of the invention, there is provided a computer-readable storage medium which stores therein a program for executing a processing which comprises an image pickup process of picking up an object image to output a video signal, a clock process of generating clock data, a recording and reproducing process of recording both the video signal and the clock data on a recording medium and of reproducing a signal from the recording medium, an extraction process of extracting the clock data from the signal reproduced from the recording medium, an input process of inputting correction information for performing a time-difference correction, and a correction process of performing the time-difference correction on the extracted clock data on the basis of the inputted correction information.

In accordance with a further aspect of the invention, there is provided an electronic apparatus for displaying time corresponding to an area, which comprises time display means for displaying the time, setting means for setting the area, determination means for determining whether the area set by the setting means is different from an area beforehand set, and picture display means for, if it is determined by the determination means that the area set by the setting means is different from the area beforehand set, displaying a predetermined picture so as to give information that an area different from the area beforehand set is set by the setting means.

In accordance with a further aspect of the invention, there is provided an electronic apparatus for displaying time corresponding to an area, which comprises time display means for displaying the time, setting means for setting the area, reading means for reading at least time-difference-related information recorded on a recording medium, and area display means for displaying information concerning an area at which information was recorded on the recording medium, on the basis of the time-difference-related information read by the reading means and information concerning a time difference of the area set by the setting means.

In accordance with a further aspect of the invention, there is provided an electronic apparatus for displaying time corresponding to an area, which comprises setting means for setting the area, receiving means for receiving information at least concerning a sending-side area sent from an external communication apparatus, reading means for reading the received information, correction means for correcting time of the area set by the setting means, in accordance with information including the received information concerning the sending-side area, and time display means for displaying the corrected time.

In accordance with a further aspect of the invention, there is provided a time display method for displaying time corresponding to an area, which comprises a step of setting the area, a step of determining whether the set area is different from an area beforehand set, and a step of, if it is determined that the set area is different from the area beforehand set, displaying a predetermined picture so as to give information that an area different from the area beforehand set is set.

In accordance with a further aspect of the invention, there is provided a time display method for displaying time corresponding to an area, which comprises a step of setting the area, a step of reading at least time-difference-related information recorded on a recording medium, and a step of displaying information concerning an area at which information was recorded on the recording medium, on the basis of the read time-difference-related information and information concerning a time difference of the set area.

In accordance with a further aspect of the invention, there is provided a time display method for displaying time corresponding to an area, which comprises a step of setting the area, a step of receiving information at least concerning a sending-side area sent from an external communication apparatus, a step of correcting time of the set area on the basis of the received information concerning the sending-side area, and a step of displaying the corrected time.

In accordance with a further aspect of the invention, there is provided a storage medium which is adapted to be loaded in an electronic apparatus and which stores therein a program for displaying time corresponding to an area, the program being executed by a central processing unit included in the electronic apparatus and comprising a process of setting the area, a process of determining whether the set area is different from an area beforehand set, and a process of, if it is determined that the set area is different from the area beforehand set, displaying a predetermined picture so as to give information that an area different from the area beforehand set is set.

In accordance with a further aspect of the invention, there is provided a storage medium which is adapted to be loaded in an electronic apparatus and which stores therein a program for displaying time corresponding to an area, the program being executed by a central processing unit included in the electronic apparatus and comprising a process of setting the area, a process of reading at least time-difference-related information recorded on a recording medium, and a process of displaying information concerning an area at which information was recorded on the recording medium, on the basis of the read time-difference-related information and information concerning a time difference of the set area.

In accordance with a further aspect of the invention, there is provided a storage medium which is adapted to be loaded in an electronic apparatus and which stores therein a program for displaying time corresponding to an area, the program being executed by a central processing unit included in the electronic apparatus and comprising a process of setting the area, a process of receiving information at least concerning a sending-side area sent from an external communication apparatus, a process of correcting time of the set area on the basis of the received information concerning the sending-side area, and a process of displaying the corrected time.

The above and further aspects and features of the invention will become apparent from the following detailed description of preferred embodiments thereof taken in conjunction with the accompanying drawings.

BRIEF DESCRIPTION OF THE SEVERAL VIEWS OF THE DRAWING

FIG. 6 is a flow chart showing an operation of a second embodiment of the invention.

FIGS. 13(a) to 13(e) are diagrams showing the respective display examples of an LCD in the fifth embodiment.

FIGS. 18(a) and 18(b) are diagrams showing pictures in which character information is displayed together with video information while causing the display of a place name representing a time area indicated by time-difference information to enlarge and blink.

FIG. 21 is a diagram showing sending sentences to be sent as character information including the address, the subject, etc.

FIG. 22 is a diagram showing contents to be displayed by the receiving-side E-mail application software.

FIGS. 23(a) to 23(d) are diagrams showing display contents obtained when reading an electronic mail sent from Japan.

FIGS. 26(a) to 26(c) are diagrams showing memory maps of a ROM included in a system control circuit in each of the fifth, sixth and seventh embodiments.

DETAILED DESCRIPTION OF THE INVENTION

Hereinafter, preferred embodiments of the invention will be described in detail with reference to the drawings.

Figure 1:
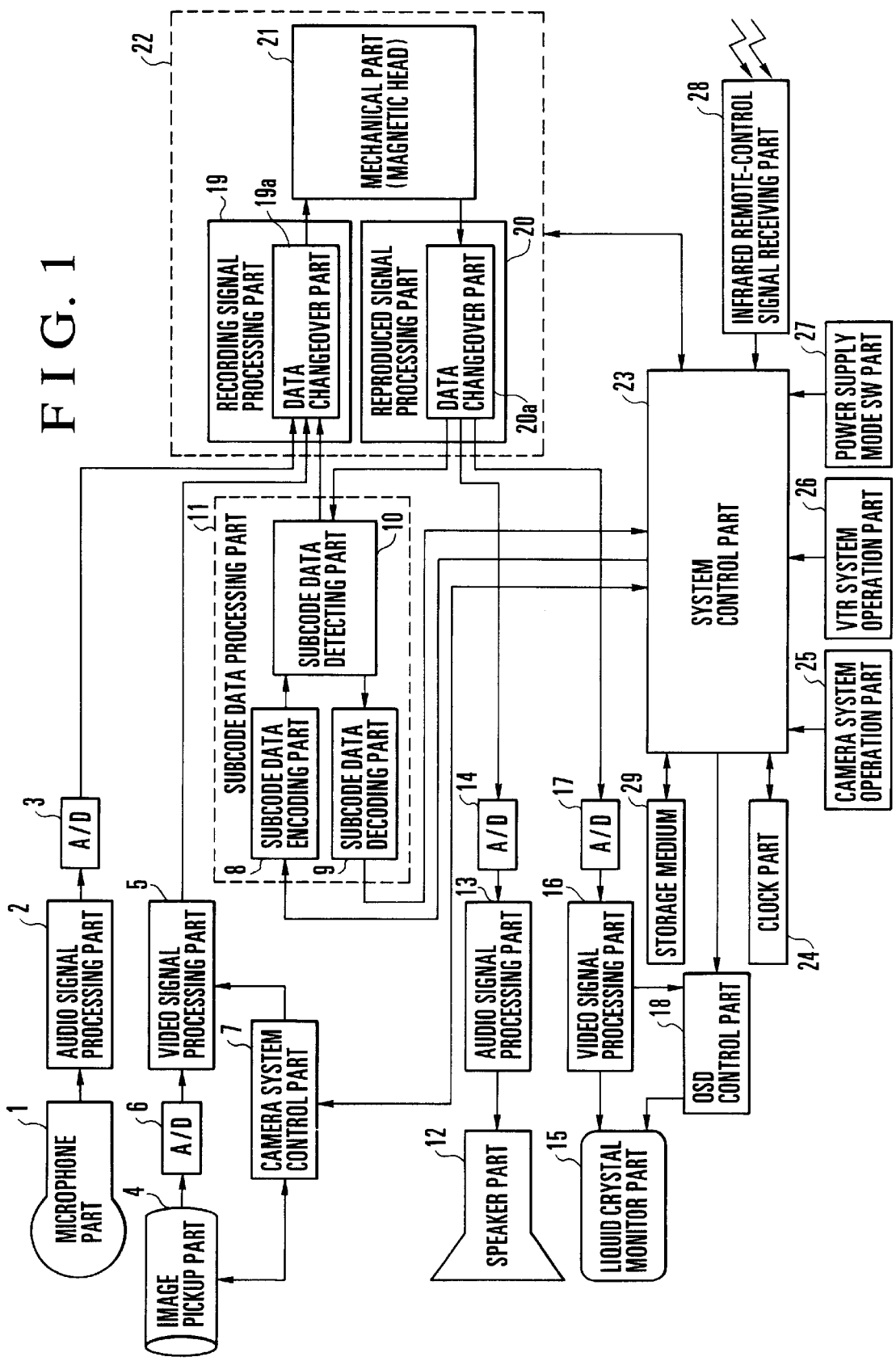
FIG. 1 is a block diagram showing the functional arrangement of a video camera according to each embodiment of the invention.

FIG. 1 is a block diagram showing the functional arrangement of a video camera equipped with a liquid crystal monitor and conforming to the home-use digital VTR standard, according to each embodiment of the invention.

Referring to FIG. 1, the video camera includes, among others, a microphone part 1, an audio signal processing part 2 arranged to apply a predetermined signal processing to an audio signal taken in by the microphone 1, an A/D conversion part 3 arranged to convert an analog audio signal into a digital audio signal, an image pickup part 4 arranged to pick up the image of an object, an A/D conversion part 6 arranged to convert an analog video signal into a digital video signal, a video signal processing part 5 arranged to apply a predetermined signal processing to a video signal taken in by the image pickup part 4 and A/D-converted by the A/D conversion part 6, a camera system control part 7 composed of a microcomputer, etc., and arranged to control the whole video camera according to instructions, etc., from a system control part 23 and a camera operation part 25.

Figure 2:
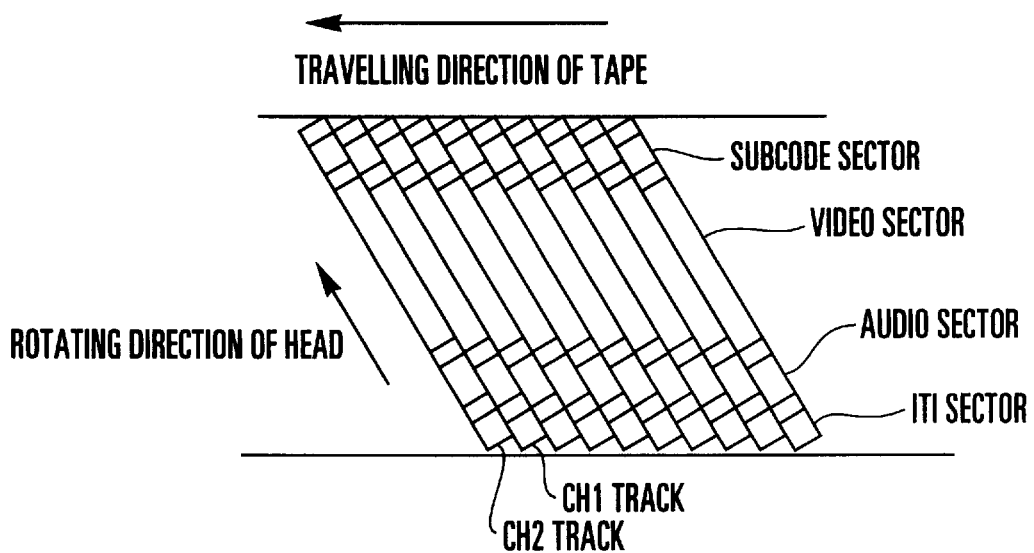
FIG. 2 is a diagram showing a tape recording format in a VTR part of the video camera (home-use digital VTR standard).

Here, a brief explanation is made about a tape recording format in a magnetic recording-and-reproducing method according to the home-use digital VTR standard. According to such a tape recording format, each recording track on the tape is composed of, as shown in FIG. 2, a subcode recording zone in which arbitrary information, such as image-taking (recording) date and time information, character code information and leader-finding (cueing) information, is recorded, a video recording zone in which a digital video signal (luminance signal and chrominance signals) is recorded, an audio recording zone in which a digital audio signal is recorded, an ITI (insert and track information) recording zone in which track ID or like information is recorded, etc.

Referring also to FIG. 1, the video camera further includes a subcode data encoding part 8 arranged to perform a D/D converting operation for converting current date and time information generated by a clock part 24 into such a signal as to be digitally recordable on the subcode recording zone, a subcode data detecting part 10 arranged to detect and output subcode data, a recording signal processing part 19 including a data changeover part 19a for selecting and outputting one of a digital audio signal, a digital video signal and subcode data, and a mechanical part 21 including a magnetic head for recording the digital signals supplied from the recording signal processing part 19 on a magnetic tape (not shown) and for reproducing digital signals recorded on the magnetic tape.

The video camera shown in FIG. 1 further includes a reproduced signal processing part 20 including a data changeover part 20a for selecting and outputting one of a digital audio signal, a digital video signal and subcode data which are reproduced from the mechanical part 21 including the magnetic head, a D/A conversion part 14 arranged to convert the digital audio signal selected and separated by the data changeover part 20a into an analog audio signal, an audio signal processing part 13 arranged to apply a predetermined signal processing to the analog audio signal as converted, and a speaker part 12 arranged to output sound.

The video camera further includes a D/A conversion part 17 arranged to convert the digital video signal selected and separated by the data changeover part 20a into an analog video signal, a video signal processing part 16 arranged to apply a predetermined signal processing to the analog video signal as converted, an OSD (on screen display) control part 18 arranged to superimpose the various kinds of information including date and time according to instructions from the system control part 23, a liquid crystal monitor part 15 arranged to display a video image obtained from the video signal processing part 16 and the superimposed information obtained from the OSD control part 18, and a subcode data decoding part 9 arranged to perform a D/D converting operation on the subcode data (image-taking date and time data, etc.) supplied from the subcode detecting part 10.

The video camera further includes the clock part 24 arranged to generate image-taking date and time data, the camera system operation part 25 composed of the various switches (ZOOM, FOCUS, etc.) related to the operation of the camera system, a VTR system operation part 26 composed of the various switches (UP, DOWN, MENU, PLAY, FF/REW, STOP, START/STOP, etc.) related to the operation of the VTR system and the operation of the whole video camera, a power supply mode switch part 27 arranged to select one of power supply modes (camera-on, VTR-on, off) of the main body of the video camera, and an infrared remote-control signal receiving part 28 arranged to receive a remote-control signal to send a remote-control code to the system control part 23.

The system control part 23, which is also included in the video camera, is composed of a microcomputer, etc., arranged to control the overall operation of the various functions of the video camera, and has the various functions including control of the power supply mode, control of shifting of operation modes of the VTR system, control of display of the various kinds of information, and storage and holding of the various image-taking modes.

The video camera further includes a storage medium 29 in which a control program of the above-mentioned microcomputer is stored according to the invention. The control program includes a program for executing a processing operation represented by the flow charts of FIGS. 3, 4, 6, 8 and 10. The storage medium 29 may be a semiconductor memory, an optical disk, a magneto-optical disk, a magnetic recording medium, or the like. Further, the storage medium 29 may be of the form of a ROM, a RAM, a CD-ROM, a memory card, a floppy disk, a magnetic tape, or the like.

The operation of the video camera having the above-described construction will be described below.

First, at the time of recording (at the time of image-taking), an audio signal taken in by the microphone part 1 is subjected to the predetermined signal processing by the audio signal processing part 2 and is, then, converted into a digital audio signal by the A/D conversion part 3. The digital audio signal is supplied to the data changeover part 19a of the recording signal processing part 19. In addition, a video signal taken in by the image pickup part 4 is converted into a digital video signal by the A/D conversion part 6. The digital video signal, after being subjected to the predetermined signal processing by the video signal processing part 5, is supplied also to the data changeover part 19a of the recording signal processing part 19.

At the same time, date and time data, which is the current clock data generated by the clock part 24, is D/D-converted by the subcode data encoding part 8 into such a signal as to be digitally recordable on the subcode recording zone of the magnetic tape and is, then, serially supplied to the data changeover part 19a of the recording signal processing part 19 through the subcode data detecting part 10.

The data changeover part 19a successively changes over and supplies, to the mechanical part 21 including the magnetic head, the digital audio signal, the digital video signal, the subcode data including the image-taking date and time data (clock data), and the ITI data in such a way as to cause them to be recorded in the respective predetermined zones in conformance with the tape recording format of the home-use digital VTR standard (see FIG. 2).

In the above-described manner, the digital audio signal, the digital video signal, data indicative of the image-taking date and time thereof, etc., are made to be simultaneously and serially recorded in the respective different zones on the magnetic tape (not shown).

Next, at the time of reproduction, a digital audio signal, a digital video signal, subcode data including image-taking date and time data, and ITI data, which are read out by the magnetic head, are constantly supplied to the data changeover part 20a, and are time-divisionally changed over and extracted to be outputted from the data changeover part 20a.

The digital audio signal outputted from the data changeover part 20a is converted by the D/A conversion part 14 into an analog audio signal. The analog audio signal is subjected to the predetermined signal processing by the audio signal processing part 13 and is, then, outputted as sound from the speaker part 12. In addition, the digital video signal outputted from the data changeover part 20a is converted by the D/A conversion part 17 into an analog video signal. Then, the analog video signal is subjected to the predetermined signal processing by the video signal processing part 16.

At the same time, the image-taking date and time data included in the reproduced subcode data outputted from the data changeover part 20a is D/D-converted by the subcode data decoding part 9 through the subcode data detecting part 10 and is, then, supplied to the system control part 23. The system control part 23 applies, to the reproduced image-taking date and time data, a time-difference correcting process based on correction information concerning a time difference which has been beforehand inputted by the operator, and converts the thus-processed image-taking date and time data into character displaying data, which is then supplied to the OSD control part 18. The character displaying data is further converted by the OSD control part 18 into superimposing data. The superimposing data is supplied to the liquid crystal monitor part 15 together with the video signal outputted from the video signal processing part 16. Accordingly, on the liquid crystal monitor part 15, such image-taking date and time data as time-difference-corrected is displayed together with a reproduced video image in a superimposed manner.

Figure 3:
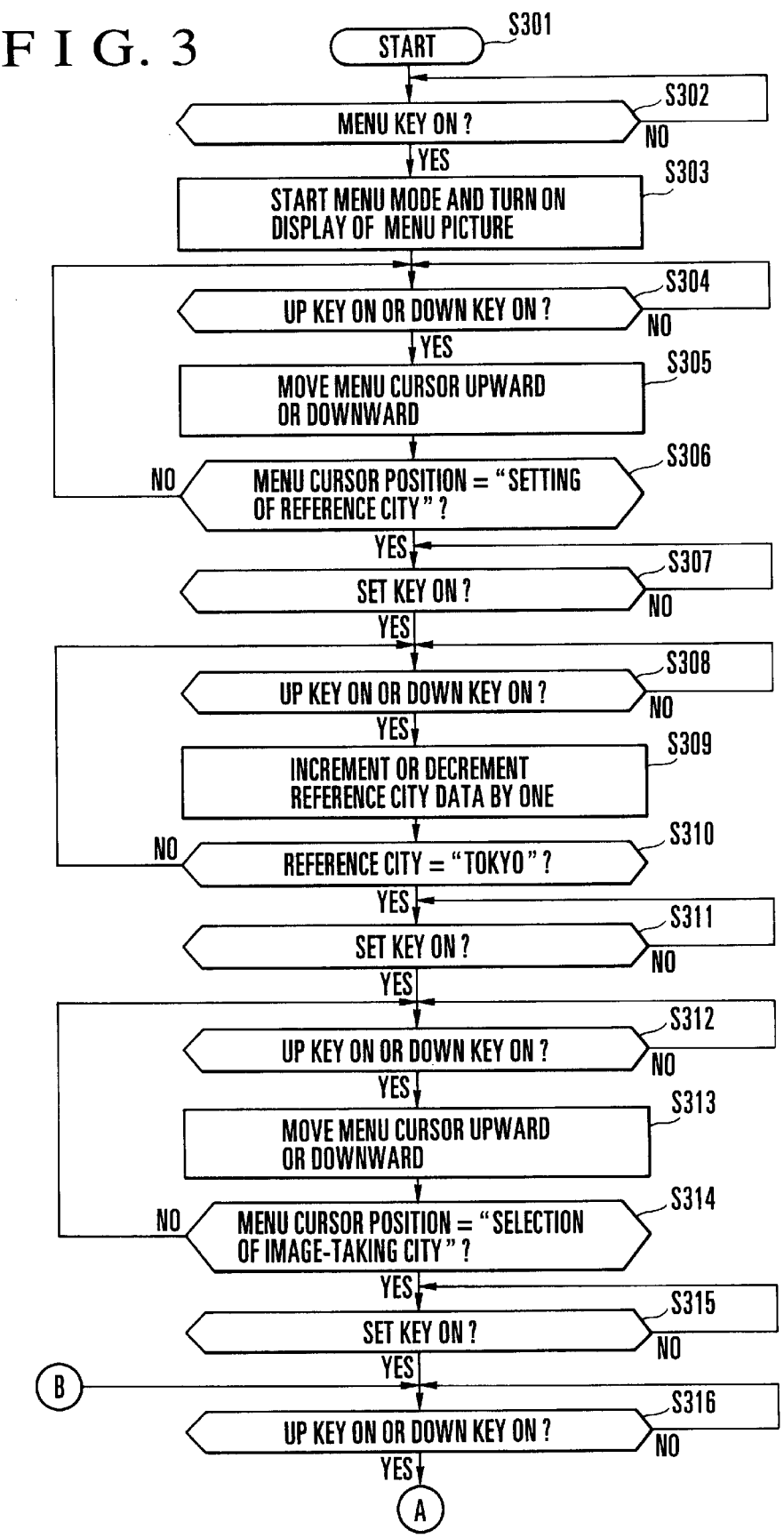
FIG. 3 is a flow chart showing an operation of a first embodiment of the invention.
Figure 4:
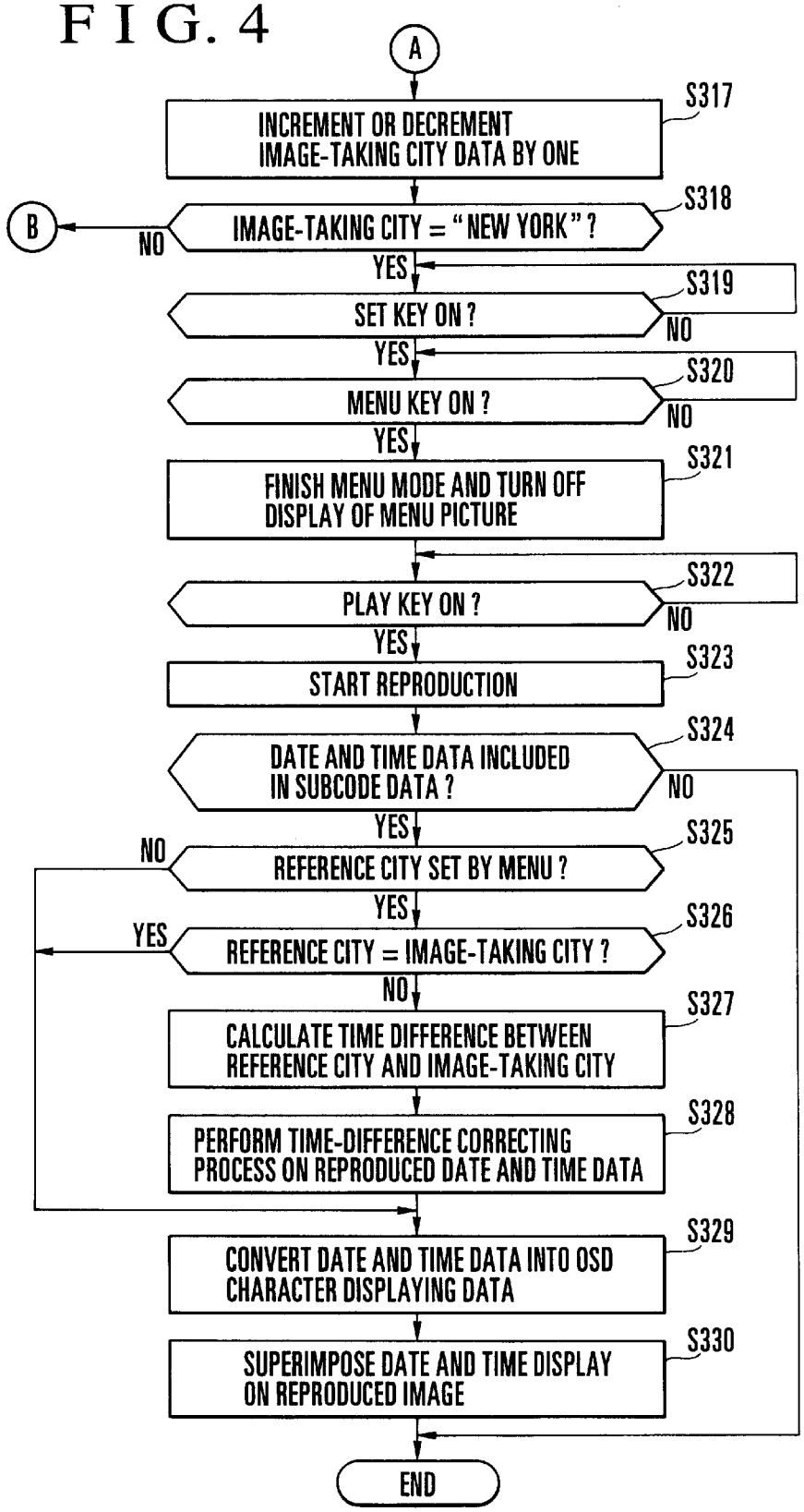
FIG. 4 is a flow chart showing the operation of the first embodiment.

FIGS. 3 and 4 are flow charts showing the operation of inputting correction information concerning a time difference by means of a menu faculty according to the first embodiment of the invention. FIGS. 5(a) to 5(g) show the display examples of the liquid crystal monitor part 15 during process of the inputting operation.

Figure 5A:
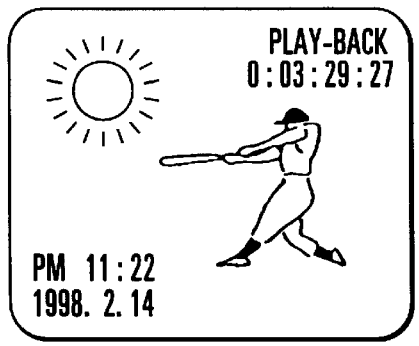
FIGS. 5(a) to 5(g) are diagrams showing the respective display examples of a liquid crystal monitor in the first embodiment.
Figure 5E:
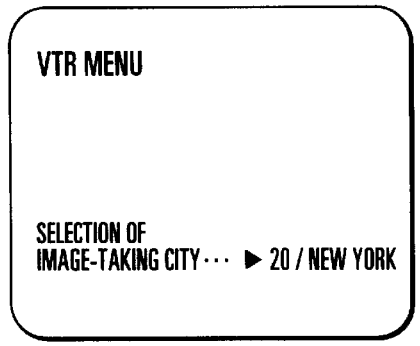

FIG. 5(a) shows the display example in a case where a video image taken and recorded in New York by the video camera in which the setting of date and time in the clock part 24 was beforehand performed in Tokyo is being reproduced (played back) in such a state as to superimpose date and time data on the video image. In the display example shown in FIG. 5(a), since the above time-difference correcting process is not yet performed, although the sun appears in the taken video image, the date and time data superimposed on the video image is displayed as "twenty-two minutes past eleven in the night", so that it is apparent that the date and time data is inconsistent with the local time at which the video image was taken.

The following describes the time-difference correcting process in the first embodiment with reference to the operation flow charts of FIGS. 3 and 4.

Figure 5B:
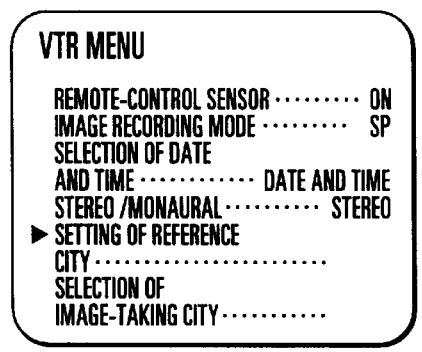
Figure 5F:
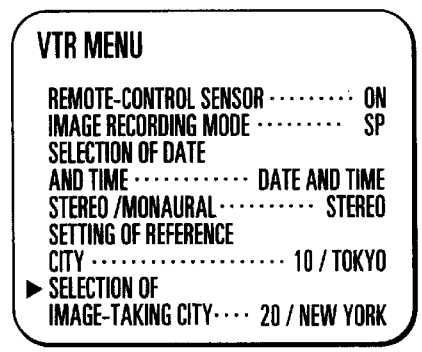
Figure 5C:
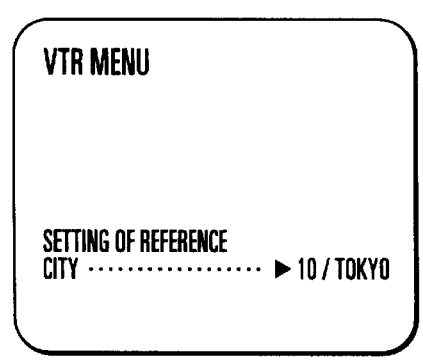

The flow of operation waits for the MENU key to be pushed in step S302. When the MENU key is pushed, the menu mode begins and a menu picture as shown in FIG. 5(b) is displayed in step S303.

First, a city name which serves as a reference for correcting a time difference is to be set. When, in step S304, the UP key or the DOWN key is pushed, a menu cursor is made to move upward or downward in step S305. The operator repeats the operations of steps S304 and S305 until the position of the menu cursor reaches the indication "setting of reference city" in step S306.

When the SET key is pushed in step S307 with the menu cursor placed at the indication "setting of reference city", the video camera is brought into a "setting of reference city" mode. When, in step S308, the UP key or the DOWN key is pushed, reference city data is incremented or decremented by one in step S309. Since, here, a description is made on the premise that the setting of date and time was performed in Tokyo, the operator repeats the operations of steps S308 and S309 until the indication "setting of reference city" indicates "10/TOKYO" (see FIG. 5(c)) in step S310. When the SET key is pushed in step S311 with the indication "setting of reference city" indicating "10/TOKYO", the reference city is set to "10/TOKYO", and the original menu picture is made to be displayed again.

Next, a city name which is to be subjected to the time-difference correcting process is to be selected. When the UP key or the DOWN KEY is pushed in step S312, the menu cursor is made to move upward or downward in step S313.

Figure 5G:
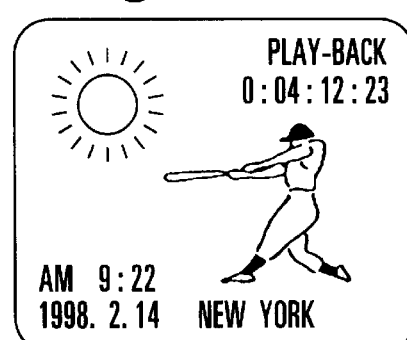
Figure 5D:
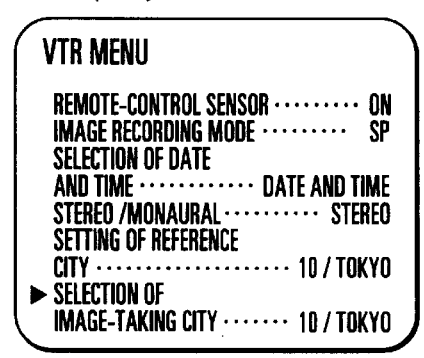

The operator repeats the operations of steps S312 and S313 until the position of the menu cursor reaches the indication "selection of image-taking city" (see FIG. 5(d)) in step S314. When the SET key is pushed in step S315 with the menu cursor placed at the indication "selection of image-taking city", the video camera is brought into a "selection of image-taking city" mode.

When the UP key or the DOWN key is pushed in step S316, image-taking city data is incremented or decremented by one in step S317. Since, in this instance, a description is made on the premise that an image-taking operation was performed in New York, the operator repeats the operations of steps S316 and S317 until the indication "selection of image-taking city" indicates "20/New York" (see FIG. 5(e)) in step S318. When the SET key is pushed in step S319 with the indication "selection of image-taking city" indicating "20/New York", the image-taking city is set to "20/New York", and the original menu picture is made to be displayed again (see FIG. 5(f)). When the MENU key is pushed in step S320, the menu mode is finished and the display of the menu picture is turned off in step S321. Then, the flow waits until the PLAY key is pushed in step S322.

When the PLAY key is pushed in step S322, a reproducing (play-back) operation is started in step S323. In this instance, a determination is made in step S324 to find if date and time data is included in the subcode data received from the subcode data decoding part 9 shown in FIG. 1. If so, the flow proceeds to step S325 so as to perform the time-difference correcting process. In step S325, a determination is made to find if the reference city has been set. If not, the flow branches to step S329 without performing the time-difference correcting process. If so, the flow proceeds to step S326, in which a comparison is made between the reference city and the image-taking city. If the two city names are the same, the time-difference correcting process is not necessary, so that the flow branches to step S329.

If, in step S326, the two city names are different from each other, a time difference between the reference city and the image-taking city is calculated in step S327. In the next step S328, the time-difference correcting process is performed on the reproduced date and time data. Incidentally, city names of the reference city and the image-taking city are internally allotted the corresponding pieces of time-difference information relative to the Greenwich mean time (or relative to the standard time of a particular city such as Tokyo). Accordingly, a time difference between the two cities are easily obtained by a subtracting operation. On the basis of the thus-obtained time-difference data, the time-difference correcting process is performed also taking the international date line into consideration.

In step S329, the date and time data is converted into OSD character displaying data. In step S330, the display of the date and time data is superimposed on the reproduced video image. Accordingly, as shown in FIG. 5(g), the local (New York) time "9:22 a.m." at which the image-taking operation was performed is displayed.

As described above, according to the first embodiment, in a case where an image-taking and recording operation was performed in an area having a time difference without effecting time-difference correction of clock means, a time-difference correcting process can be performed on the bass of correction information inputted at the time of reproduction. Therefore, even after an image-taking and recording operation was performed in an area having a time difference, clock data for the image-taking and recording operation can be effectively corrected in time difference at the time of reproduction.

Further, the first embodiment requires no special, additional hardware functions (such as the GPS receiving apparatus), and can take the same construction as the system of a conventional video-camera-integrated recording-and-reproducing apparatus. Therefore, the first embodiment has such an advantage that cost, shape, etc., of the video camera can be kept unchanged.

Further, area names are used as correction information, and time-difference information corresponding to the area names is provided. Therefore, even if a time difference between a reference area and an image-taking area is unknown, the correction information can be inputted only by inputting the area names.

Next, a second embodiment of the invention will be described.

while, in the above first embodiment, such a description is made about a method of inputting information for time-difference correction that a reference city name and a correction city name are designated by using the menu faculty, the second embodiment is arranged to directly set the time as information for time-difference correction.

The operation of the second embodiment is described below with reference to the operation flow chart of FIG. 6 and the display examples of the liquid crystal monitor part 15 shown in FIGS. 7(a) to 7(c). Incidentally, the whole system arrangement of the second embodiment is the same as that shown in FIG. 1, and, therefore, a description thereof is omitted here.

Figure 7A:
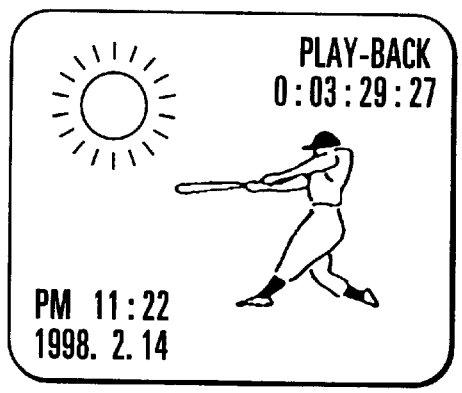
FIGS. 7(a) to 7(c) are diagrams showing the respective display examples of a liquid crystal monitor in the second embodiment.

FIG. 7(a) shows the display example in a case where a video image taken and recorded in New York by the video camera in which the setting of date and time in the clock part 24 was beforehand performed in Tokyo is being reproduced (played back) in such a state as to superimpose date and time data on the video image. In the display example shown in FIG. 7(a), since the above time-difference correcting process is not yet performed, although the sun appears in the taken video image, the date and time data superimposed on the video image is displayed as "twenty-two minutes past eleven in the night", so that it is apparent that the date and time data is inconsistent with the local time at which the video image was taken.

First, in step S502, a determination is made to find if date and time data is included in the reproduced subcode data. If not, the determination is repeated until date and time data is found to be included in the reproduced subcode data. If so, a determination is made in step S503 to find if the UP key is pushed. If so, the flow branches to step S504, in which time-difference information is incremented by one and the display of a time-difference correcting time is turned on. If not, a determination is made in step S505 to find if the DOWN key is pushed. If so, the flow proceeds to step S506, in which time-difference information is decremented by one and the display of a time-difference correcting time is turned on. If not, the flow returns to step S502. In step S507, a time-difference calculating process is performed on the reproduced date and time data by using the time-difference correcting time set in step S504 or step S506. In step S508, the thus-processed date and time data is converted into OSD character displaying data. In step S509, the display of the date and time data is superimposed on the reproduced video image.

Figure 7B:
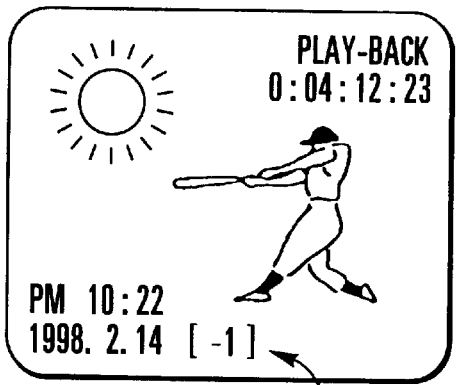

FIG. 7(b) shows the display example obtained when the DOWN key has been pushed once to set the display of a time-difference correcting time to "−1". In the display example shown in FIG. 7(b), the display "11:22 p.m." shown in FIG. 7(a) is corrected to the display "10:22 p.m.".

Figure 7C:
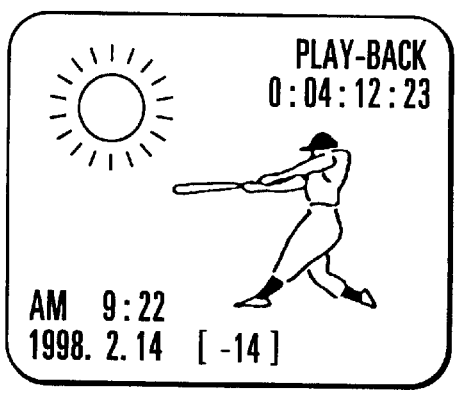

Repeating the above operation to set "−14 hours" as a time difference between Tokyo and New York results in the display example shown in FIG. 7(c), in which the local (New York) time "twenty-two minutes past nine in the morning" obtained when the image-taking operation was performed is displayed.

Next, a third embodiment of the invention will be described.

In the third embodiment, the clock part 24 included in the video camera is set in such a manner that the "reference city" is used as information on time serving as a reference for time-difference correction among time-difference information used in the first embodiment.

Figure 8:
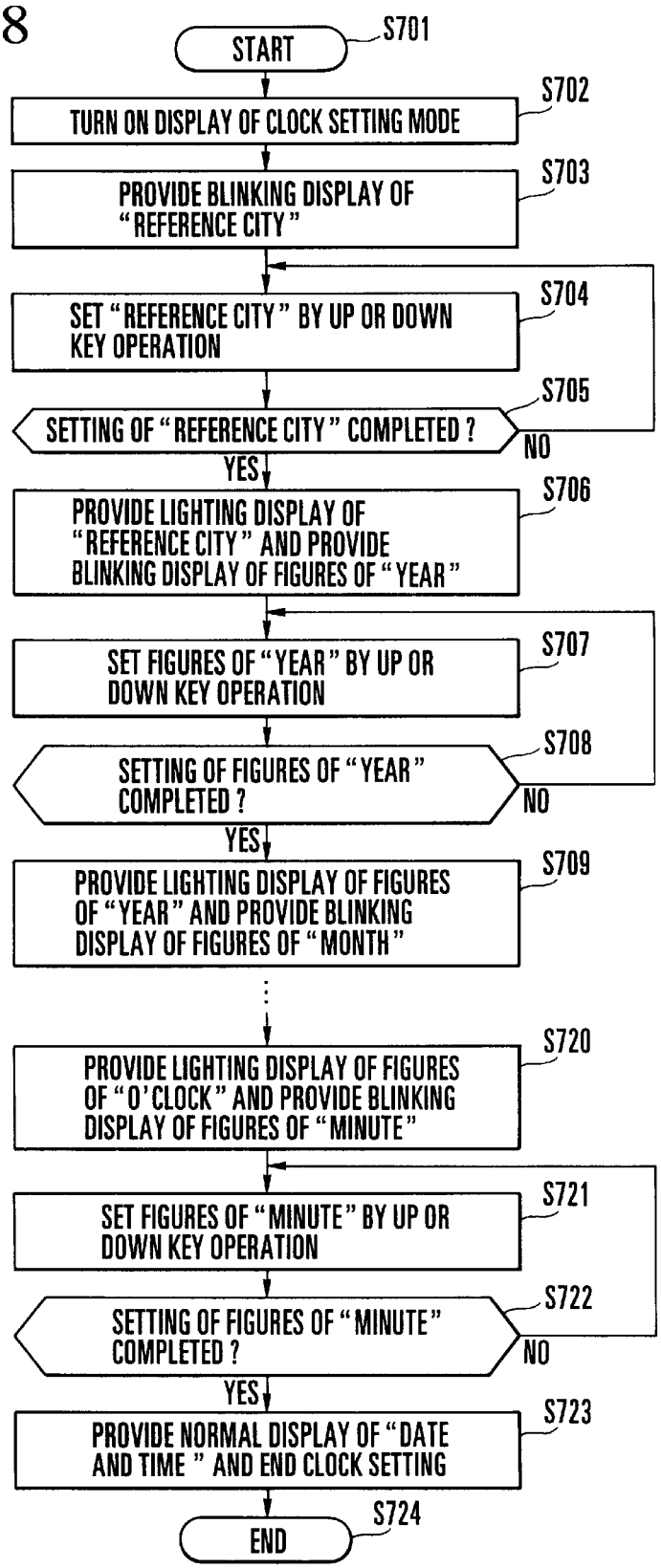
FIG. 8 is a flow chart showing an operation of a third embodiment of the invention.
Figure 9A:
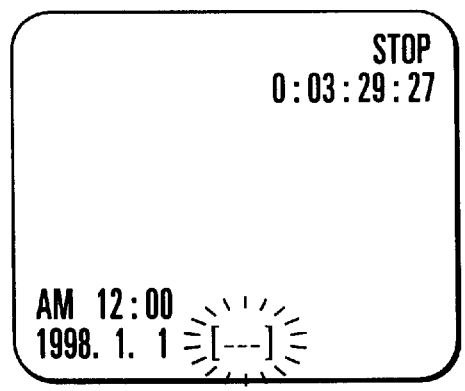
FIGS. 9(a) to 9(c) are diagrams showing the respective display examples of a liquid crystal monitor in the third embodiment.
Figure 9B:
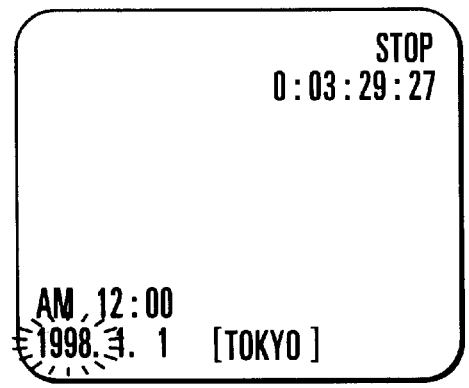
Figure 9C:
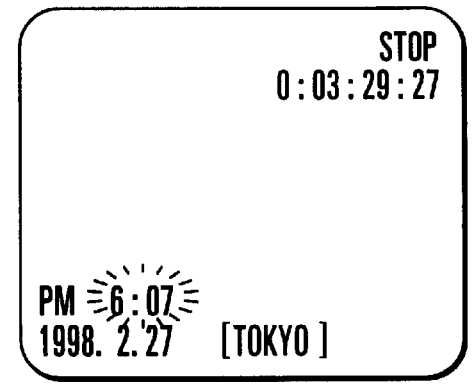

The operation of the third embodiment is described below with reference to the flow chart of FIG. 8 and the display examples of the liquid crystal monitor part 15 shown in FIGS. 9(a) to 9(c). Incidentally, the whole system arrangement of the third embodiment is the same as that shown in FIG. 1, and, therefore, a description thereof is omitted here.

When a clock setting mode is started in step S701, the display of the clock setting mode is turned on in step S702. In step S703, a display part for the reference city is made to blink, indicating that the video camera is in the process of setting the reference city (see FIG. 9(a)). In step S704, the reference city (here, Tokyo) is set by operating the UP key or the DOWN key. In step S705, it is confirmed that the setting of the reference city is completed, and, then, the flow proceeds to step S706. In step S706, the display of the reference city is made to light up, and the display of figures of "year" to be next set is made to blink (see FIG. 9(b)). In step S707, the figures of "year" are set by operating the UP key or the DOWN key.

In step S708, it is confirmed that the setting of the figures of "year" is completed, and, then, the flow proceeds to step S709. In step S709, the display of the figures of "year" is made to light up, and the display of figures of "month" to be next set is made to blink. Subsequently, in the same manner, the setting of figures of "month", "day" and "o'clock" is performed. After the above operation, the flow proceeds to step S720. In step S720, the display of figures of "o'clock" is made to light up, and the display of figures of "minute" to be next set is made to blink (see FIG. 9(c)). In step S71, the figures of "minute" are set by operating the UP key or the DOWN key. In step S722, it is confirmed that the setting of the figures of "minute" is completed, and, then, the flow proceeds to step S723. In step S723, the display of "date and time" is brought into a normal display state, and the clock setting is ended. As described above, since the reference time corresponding to an area name is set, it becomes unnecessary to repeatedly set the reference time for the area.

Next, a fourth embodiment of the invention will be described.

According to the fourth embodiment, a corrected state in time difference in a conventional world clock or a corrected state in time difference in the above-mentioned embodiments can be easily returned to an uncorrected, original state by operating only one key once.

Figure 10:
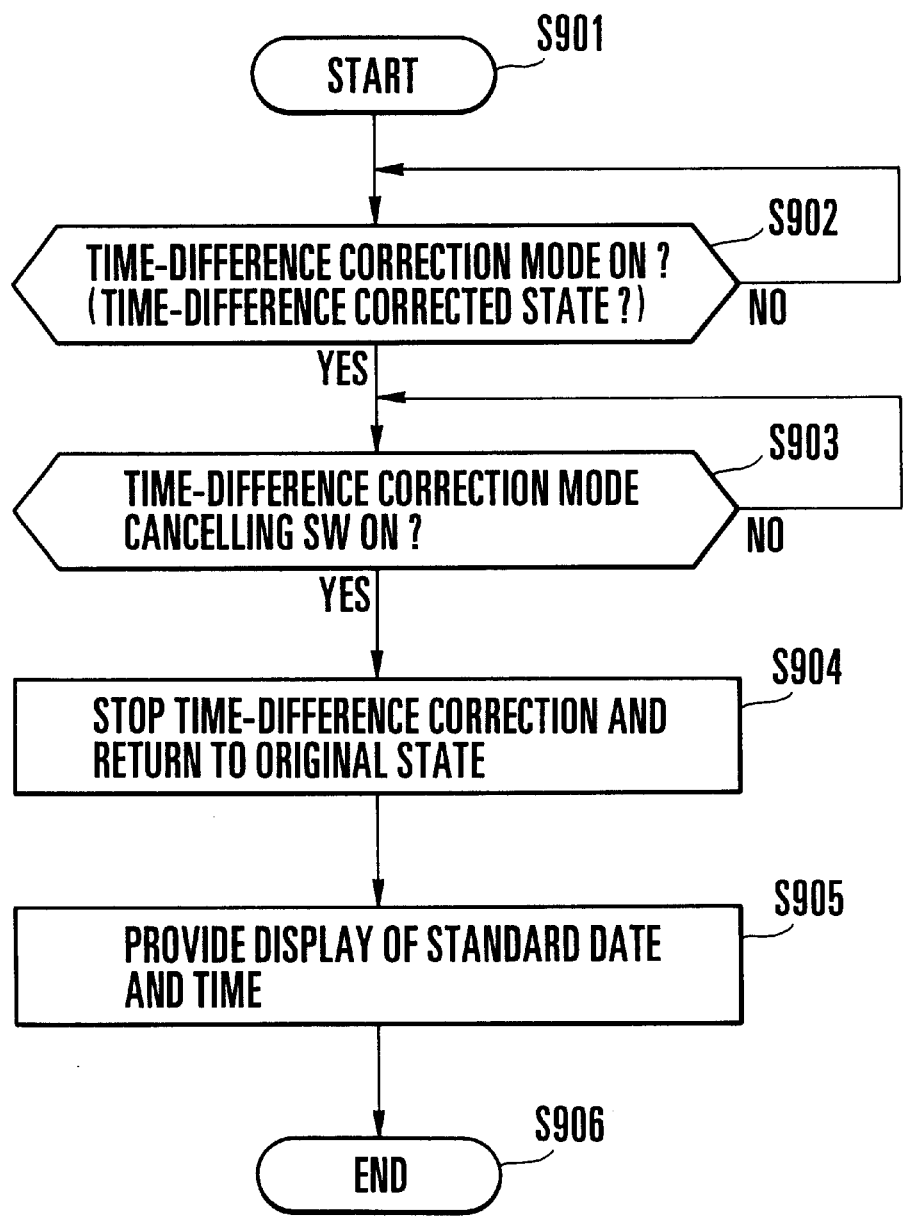
FIG. 10 is a flow chart showing an operation of a fourth embodiment of the invention.
Figure 11A:
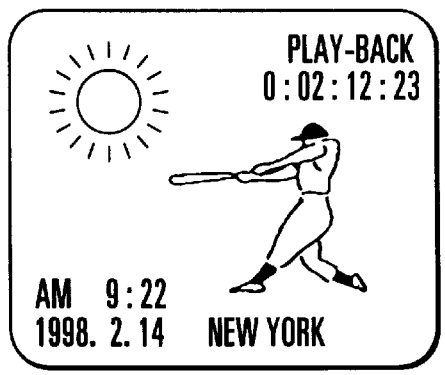
FIGS. 11(a) and 11(b) are diagrams showing the respective display examples of a liquid crystal monitor in the fourth embodiment.
Figure 11B:
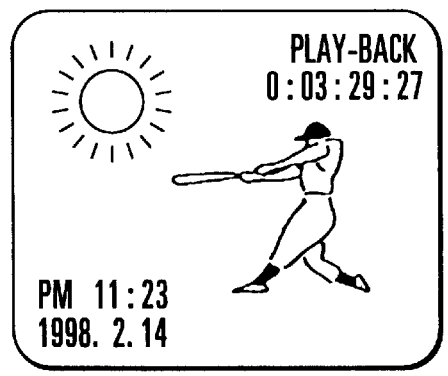

The operation of the fourth embodiment is described below with reference to the flow chart of FIG. 10 and the display examples of the liquid crystal monitor part 15 shown in FIGS. 11(a) and 11(b). Incidentally, the whole system arrangement of the fourth embodiment is the same as that shown in FIG. 1, and, therefore, a description thereof is omitted here.

First, in step S902, a determination is made to find if the video camera is now in a time-difference corrected state. If not, the determination in step S902 is repeated. If so, the flow proceeds to step S903. In step S903, a defemination is made to find if a time-difference correction mode cancelling switch provided in the VTR system operation part 26 is pushed. The display example of the liquid crystal monitor part 15 in the time-difference corrected state is shown in FIG. 11(a). In the display example shown in FIG. 11(a), the indication "New York", at which a video image currently being reproduced was taken, is displayed. If it is found in step S903 that the time-difference correction mode cancelling switch is pushed, the flow proceeds to step S904. In step S904, the current time-difference corrected state is stopped (cancelled) and is returned to an uncorrected, original state. In step S905, the clock setting returns to the standard time, the display of the area name is turned off, and the display of the standard date and time is provided (see FIG. 11(b)).

While, in each of the first to fourth embodiments, the invention is applied to a video camera, the invention can be also applied to a digital still camera for taking a still image.

Figure 12:
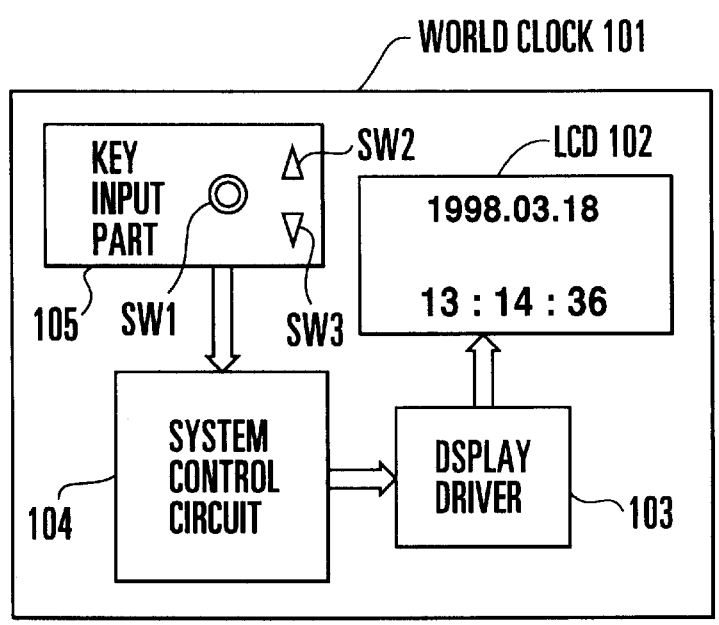
FIG. 12 is a block diagram showing the arrangement of a world clock according to a fifth embodiment of the invention.

FIG. 12 is a block diagram showing the arrangement of a world clock according to a fifth embodiment of the invention. The world clock 101 is composed of a key input part 105 arranged to set an area (area name), a system control circuit 104, an LCD 102 and a display driver 103.

FIGS. 13(a) to 13(e) are diagrams showing the display examples of the LCD 102. FIG. 13(a) shows the date and time in Tokyo. The following describes an example of case where, in the state shown in FIG. 13(a), the operator changes the area setting from "Tokyo" to "London".

First, the operator turns on an area setting change switch SW1 of the key input part 105. Then, the picture on the LCD 102 is changed to an area setting change picture shown in FIG. 13(b). The operator selects "London", which is an area intended to be set, by operating an upward switch SW2 or a downward switch SW3, and turns on the switch SW1 once more to decide the selection.

In response to the above operation, the picture on the LCD 102 is changed to such a picture as shown in FIG. 13(c), thereby informing the operator that the area setting has been changed to "London". In this instance, character information of "London" representing the area information is displayed in an enlarged style and in a blinking manner, thereby improving the recognition ratio of the operator. Such an enlarged and blinking display continues for five seconds and, after that, the picture on the LCD 102 changes to a normal display shown in FIG. 13(d). Incidentally, in a case where the LCD 102 is capable of color display, the color of character information of "London" may be changed so as to facilitate recognition of the operator.

Further, in such a situation that it is unnecessary to always display the area setting (for example, a situation where a period of time for which the operator is not out of a common-time area is long), such a setting as not to display the area setting is possible. An operation for the setting of not displaying the area setting is similar to the operation for performing the area setting, as follows. First, the operator turns on the area setting change switch SW1 to call the area setting picture shown in FIG. 13(b). In the area setting picture shown in FIG. 13(b), there is displayed, among others, the indication "Not Display", which is a selective item for not displaying. The operator selects this item by operating the upward switch SW2 or the downward switch SW3, and decides the selection by turning on the area setting change switch SW1. Then, only the area information disappears from the picture, as shown in FIG. 13(e). By performing the above operation, it is possible not only to reduce the complication of a picture but also to lower the electric consumption.

Figure 14:
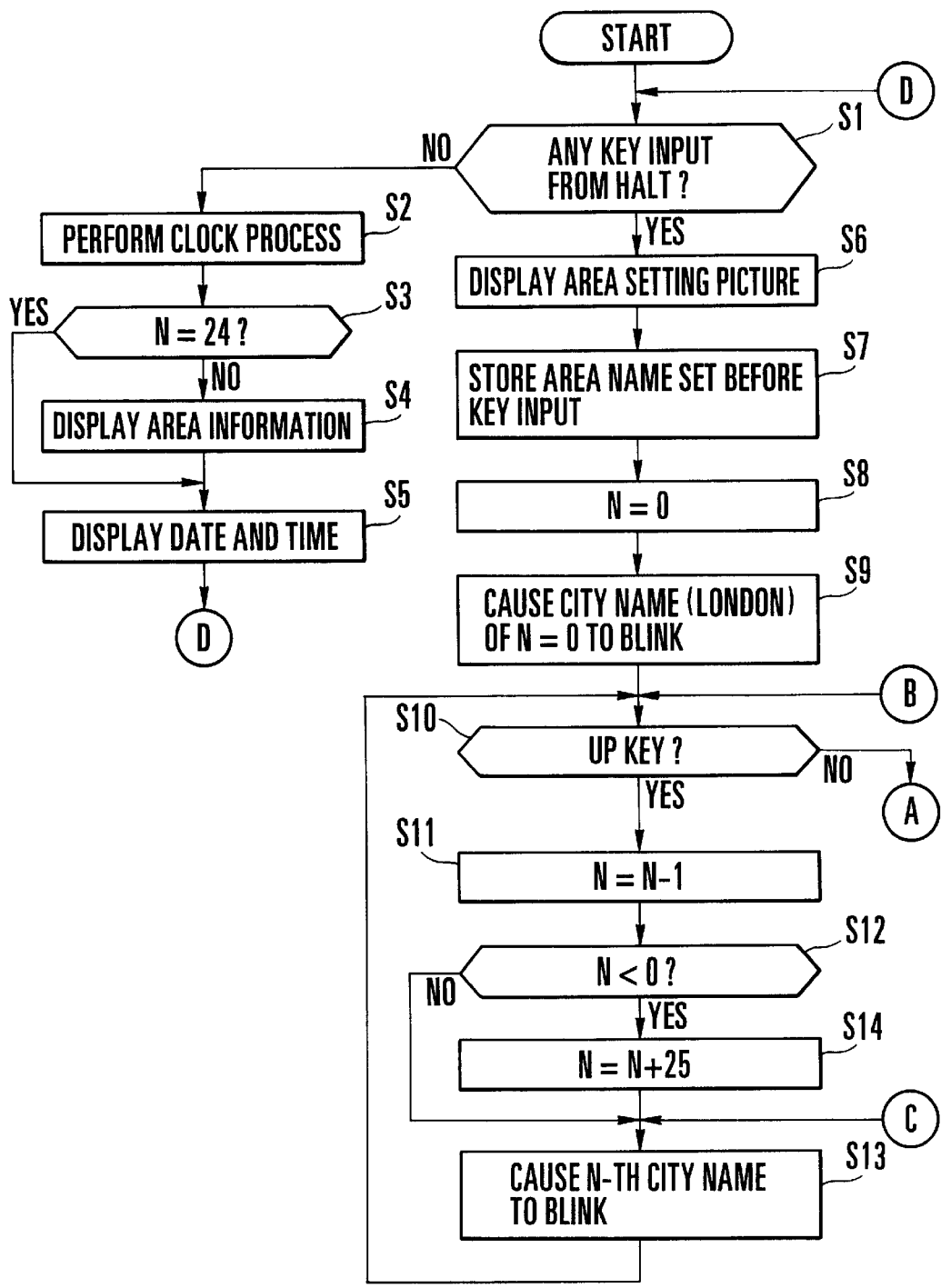
FIG. 14 is a flow chart showing an operation processing procedure of the world clock shown in FIG. 12.
Figure 15:
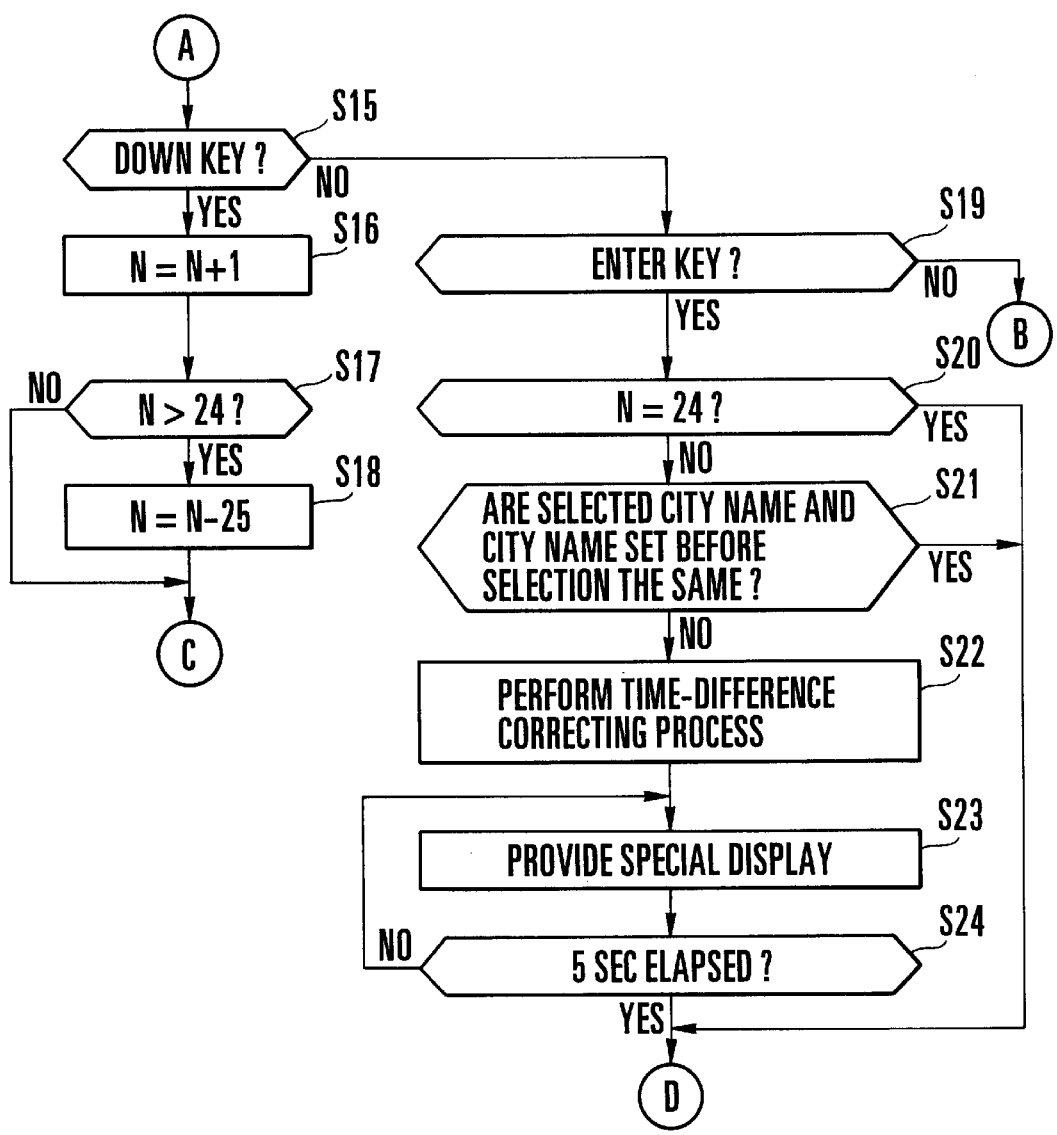
FIG. 15 is a flow chart showing the operation processing procedure of the world clock shown in FIG. 12.

FIGS. 14 and 15 are flow charts showing the operation processing procedure of the world clock 101. A processing program for the operation processing procedure of the world clock 101 is stored in a ROM (not shown) included in the system control circuit 104, and is executed by a CPU (not shown) included also in the system control circuit 104. In the flow charts of FIGS. 14 and 15, variables N are set to respectively correspond to twenty-four representative city names having respective time differences of 0, 1, 2 . . . 23 hours from the Greenwich mean time (GMT). For example, in the case of N=0, the variable N corresponds to London, a time difference of which is zero. In addition, in the case of N=24, it is determined that the area information is so selected as not to be displayed.

First, in step S1, a determination is made to find if the area setting change switch SW1 is turned on from the halt state. If not, a clock process is performed in step S2.

In the next step S3, a determination is made to find if the deletion of the area information (i.e., N=24) is selected. If not N=24, a city name corresponding to the variable N is displayed in step S4. If N=24, without displaying the area information, date and time data as changed is displayed on the LCD 102. After that, the flow returns to step S1.

On the other hand, if the area setting change switch SW1 is turned on in step S1, an area setting picture is displayed in step S6.

Subsequently, in step S7, an area name which has been set before the turning-on of the area setting change switch SW1 is temporarily stored. In step S8, the variable N is initialized to the value "0". In step S9, the indication "London", which is a city name of N=0, is made to blink. After that, in step S10, a determination is made to find if the UP key (upward switch SW2) is pushed.

If it is found in step S10 that the UP key is pushed, the value "1" is subtracted from the value of the variable N in step S11. Then, in step S12, a determination is made to find if the variable N is less than the value "0". If so, the variable N is changed to the value corresponding to a city name having the corresponding time difference in step S14. In step S13, the display of that city name is made to blink instead of "London". In addition, if the variable N is not less than the value "0" in step S12, a city name corresponding to the variable N as unchanged is made to blink in step S13. After that, the flow returns to the process of step S10.

On the other hand, if it is found in step S10 that the UP key is not pushed, a determination is made to find if the DOWN key (downward switch SW3) is pushed in step S15. If so, the value "1" is added to the variable N in step S16. Then, a determination is made to find if the variable N is greater than the value "24" in step S17. If so, the variable N is changed to the value corresponding of a city name having the corresponding time difference in step S18, and the flow proceeds to the process of step S13. In addition, if the variable N is not greater than the value "24", the flow proceeds to step S13 directly from step S17.

Further, if it is found in step S15 that the key input is neither the operation of the UP key nor the operation of the DOWN key, a determination is made to find if the ENTER key (area setting change switch SW1) is pushed in step S19. If not, the flow branches to the process of step S10. If so, a determination is made to find if the variable N is equal to the value "24" in step S20.

If N=24 in step S20, the flow returns to the process of step S1. If not N=24, a determination is made to find if a city name which corresponds to the variable N and a city name which has been selected before the turning-on of the area setting change switch SW1 are the same in step S21. If so, the flow returns to the process of step S1. If not, a time-difference correcting process is performed in step S22. In step S23, a special display is provided (see FIG. 13(c)) so as to strongly inform the operator that the area name has been changed. In step S24, the special display is made to continue for five seconds, and, then, the flow returns to the process of step S1.

As described above, according to the fifth embodiment, the area information is made easy for the operator to recognize, so that it is possible to facilitate the communication of information between areas having a time difference, the management of time at the time of movement to an area having a time difference, and the management of information recorded at an area having a time difference.

Further, the area information is emphasized to inform the operator, so that the recognition ratio of the operator for the area information can be improved and an erroneous recognition of time can be diminished.

On the other hand, in a case where the area information is unnecessary, the area information is made not to be displayed. Therefore, it is possible to make an information displaying picture as easy as possible to see, and it is possible to simplify the software processing related to displaying.

Figure 16:
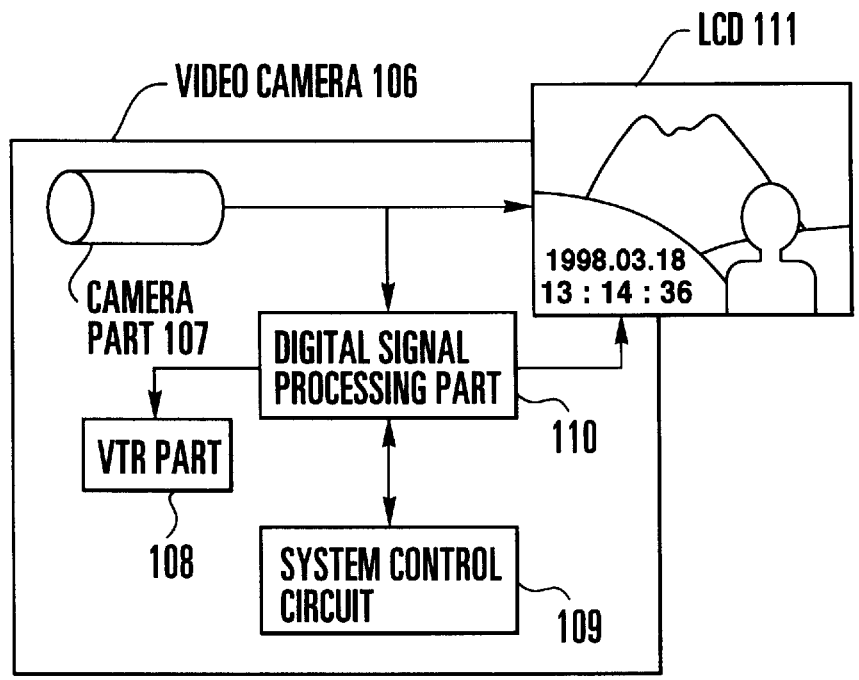
FIG. 16 is a block diagram showing the arrangement of a video camera according to a sixth embodiment of the invention.

FIG. 16 is a block diagram showing the arrangement of a video camera according to a sixth embodiment of the invention. The video camera 106, which is a digital video camera having a world clock incorporated therein, is composed of a camera part 107, a VTR part 108, a digital signal processing part 110, a system control circuit 109 and an LCD 111. In the following, a description is made about a case where a video image already recorded by the video camera is reproduced from a magnetic tape.

The system control circuit 109 included in the video camera 106 has an internal world clock function, and is now assumed that the area for setting time is set to Tokyo. Further, it is first assumed that a magnetic tape on which a video image taken by the video camera in Japan has been recorded is subjected to reproduction (play-back).

Figure 17:
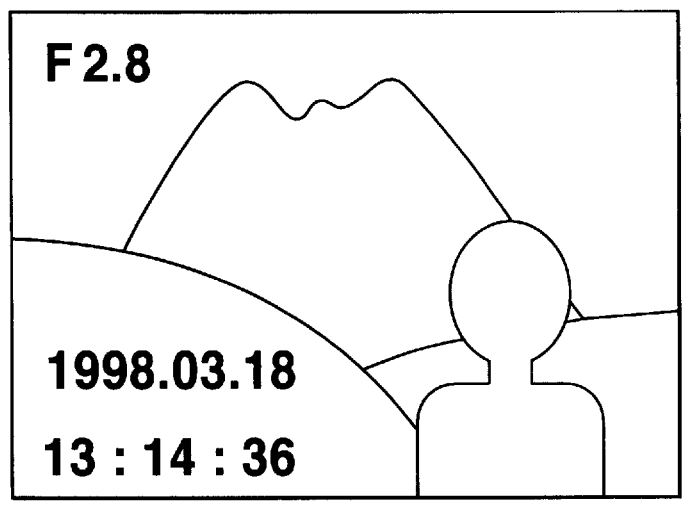
FIG. 17 is a diagram showing a picture in which character information is displayed together with video information.

First, the magnetic tape is loaded in the VTR part 108 to start reproduction. Since the magnetic tape, which is currently employed as a video cassette, has recorded therein not only video information and audio information as taken but also code information such as an image-taking condition, image-taking date and time information and time-difference information of an image-taking area, it is possible to read the code information by the VTR part 108 and display the code information as character information together with the video information. FIG. 17 is a diagram showing a picture in which the character information is displayed together with the video information.

In this instance, a determination is made to find if the area at which an image taking and recording operation was performed by means of the magnetic tape is a time area having the time equivalent to the Japanese standard time, on the basis of time-difference information which was set as code information at the time of the image taking and recording operation. Further, a determination is made by the system control circuit 109 to find if the time area is the same as an area (Tokyo) set in the world clock included in the video camera. If it is the same, a display process is performed in such a manner as not to display the area information. Accordingly, it is possible to automatically delete unnecessary information from the complicated picture display.

Next, a description is made about a case where a video image which was taken and recorded in England is reproduced from a magnetic tape. On the magnetic tape, since the image taking and recording operation was performed in England, time-difference information of England (time difference "0" relative to the Greenwich mean time) was also recorded at the time of the image taking and recording operation. By reading the time-difference information, the system control circuit 109 determines that the time-difference information as read differs from time-difference information of Tokyo. Then, if different time differences are found, the display of a place name (in this case, London) representing the time area indicated by the time-difference information recorded on the magnetic tape is made to enlarge and blink, so that it is possible to cause the operator to surely make a recognition.

FIG. 18(a) is a diagram showing a picture in which character information is displayed together with video information while the display of a place name representing a time area indicated by time-difference information is made to enlarge and blink. Such an enlarged and blinking display continues for a predetermined period of time and, after that, returns to an ordinary display as shown in FIG. 18(b). In this case, since a video image which was taken at a time area different from the time area for which the world clock of the video camera was set is being reproduced, the area information remains displayed so as to make the operator recognize such a fact. Incidentally, the display color of a place name (in this case, London) representing the time area may be changed for the purpose of facilitating recognition.

Figure 19:
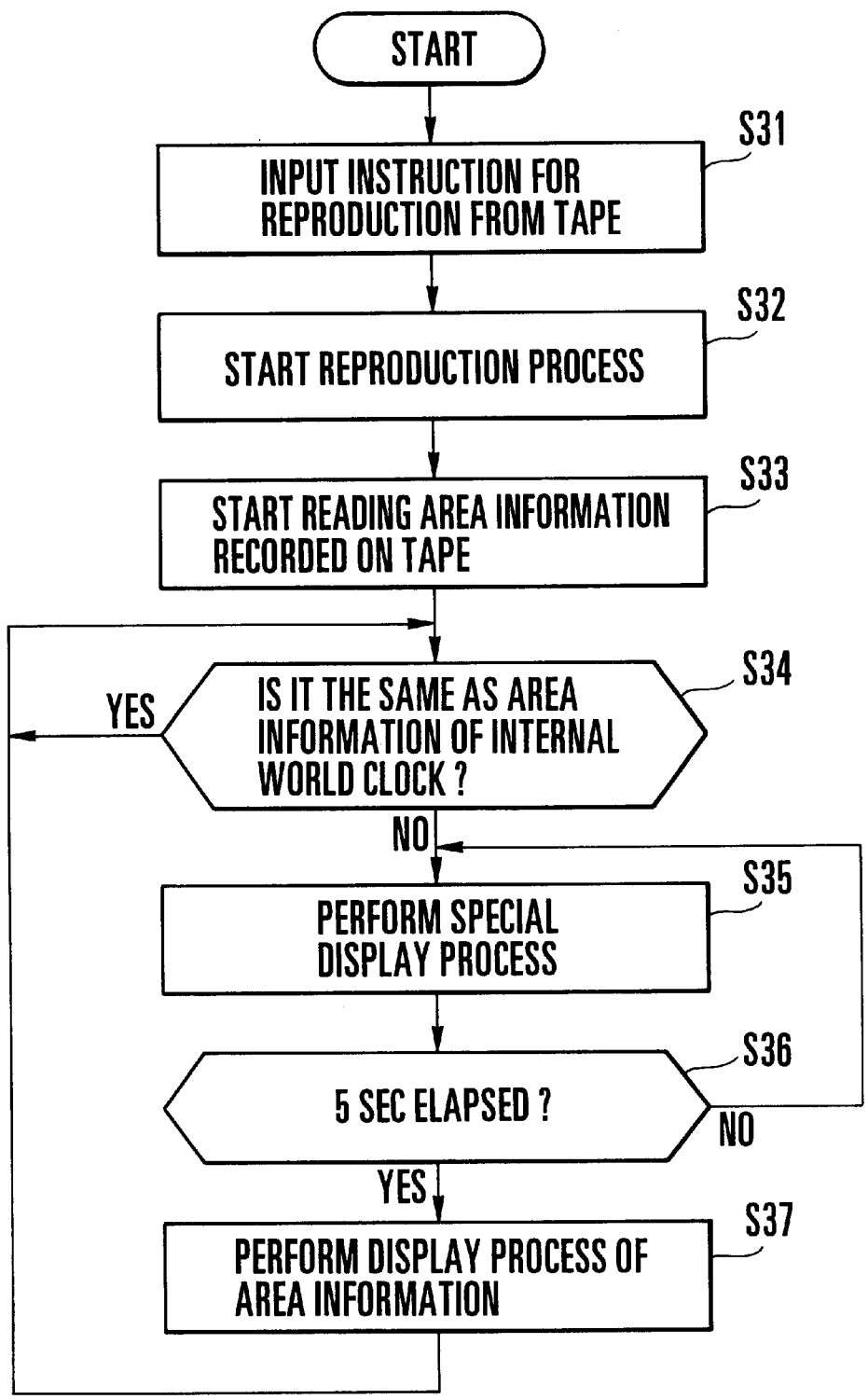
FIG. 19 is a flow chart showing an operation processing procedure of the video camera according to the sixth embodiment.

FIG. 19 is a flow chart showing the operation processing procedure of the video camera according to the sixth embodiment. A program for the operation processing procedure is stored in a ROM (not shown) included in the system control circuit 109, and is executed by a CPU (not shown) included also in the system control circuit 109.

First, in step S31, an instruction for reproduction from a magnetic tape loaded in the video camera is inputted. Upon receipt of the instruction for reproduction, the flow starts to perform a reproduction processing in step S32. During the reproduction processing, area information recorded on the magnetic tape is read out in step S33. In the next step S34, a determination is made to find if the area information read out and area information set in the world clock are the same. If so, the flow returns to the processing of step S34.

If it is found in step S34 that the area information read out is different from the area information set in the world clock, a special display process is performed in step S35 so as to make the operator strongly recognize such a difference (see FIG. 18(a)). After the special display process is found to have continued five seconds in step S36, the display process of the area information read out is performed in step S37. After that, the flow returns to the processing of step S34 to constantly watch area information recorded on the magnetic tape. This is because there is a possibility that different pieces of area information may be recorded on one and the same magnetic tape.

As described above, according to the sixth embodiment, in a case where area information recorded on a magnetic tape and area information set beforehand in a video camera which is to be used for reading a recorded signal from the magnetic tape are different from each other, a special display is provided to make the operator recognize that information which is now being read is information which was recorded at a different area. Accordingly, a possibility of causing the operator to recognize such a fact is improved. Thus, in a case where information which was recorded at an area having a time difference is to be read, the arrangement of the sixth embodiment makes it easy for the operator to recognize the presence of the time difference.

Further, if the video camera is provided with a switch for setting area information, the system control circuit is enabled to discriminate the presence or absence of a time difference by making a check on area information set by the switch and area information read from a magnetic tape.

Figure 20:
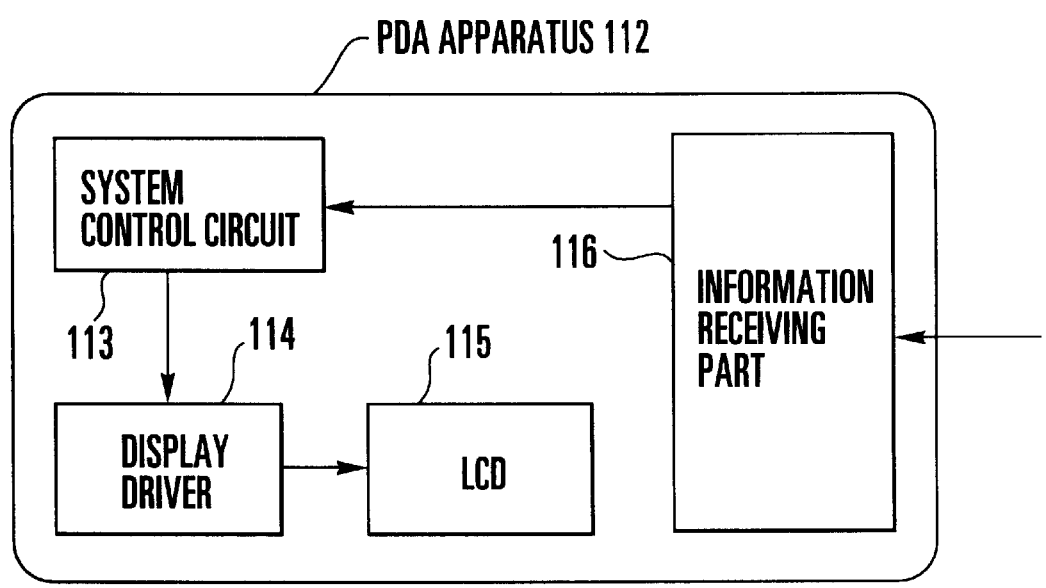
FIG. 20 is a diagram showing the arrangement of a PDA (personal digital assistants) apparatus according to a seventh embodiment of the invention.

FIG. 20 is a block diagram showing the arrangement of a PDA (personal digital assistants) apparatus according to a seventh embodiment of the invention. The PDA apparatus 112 is composed of a system control circuit 113 having a world clock function, an LCD 115, a display driver 114 and an information receiving part 116. The PDA apparatus 112 is capable of receiving an electronic mail (E-mail).

Here, a description is made assuming that an E-mail is sent from Japan and the PDA apparatus 112 receives the E-mail in England.

First, when sending letter information by the E-mail, a sending-side PDA apparatus sends not only the letter information but also character information including an address of the sending side, a subject of the letter information, etc. FIG. 21 is a diagram showing sentences to be sent as the character information including an address, a subject, etc.

Information on the sending date and time and the sending country is generally added to an E-mail at the gate of a domain through which the E-mail passes when a mail address is sent. Therefore, at each gate of domains through which the E-mail passes until reaching the receiving-side domain, information on the time of passage and information as to which standard time is used as the time are added to the E-mail. For example, it is assumed that the time when the sender made the PDA apparatus send the E-mail and the E-mail passed through the first domain is fifteen minutes fifty-seven seconds past twenty-three of Mar. 15 (Sunday), 1998.

In general, passage time information and standard time information which are added at the gate of the domain in the above instance are of the following form:

Sun, Mar. 15, 1998 23:15:57 JST where JST represents the Japanese standard time.

Generally, time information and area information displayed by the receiving-side E-mail application software are sometimes the time information and area information which were added for the first time to the received E-mail (i.e., the passage time and the standard time information thereof at which the E-mail passed through the first domain) and are sometimes the time information and area information which were added for the last time to the received E-mail (i.e., the time information and area information at which the E-mail reached a receiving-side domain). FIG. 22 is a diagram showing the contents displayed by the receiving-side E-mail application software.

It is here assumed that the receiving-side E-mail application software is arranged to detect, as time information and area information, the time information and area information which were added for the first time to the E-mail. The time information and area information may be detected by such a method as to find out time information and area information which were added for the first time from within the whole file received.

Accordingly, the PDA apparatus 112 is capable of, when receiving the above time information and area information, informing the operator that the E-mail has been received, in such a display manner as shown in FIG. 22.

In a case where the sending-side operator has sent information with the Japanese standard time used, the area information indicative of the sending side is displayed as "Tokyo", as indicated at the first E-mail shown in FIG. 22. On the other hand, the sending time is displayed as being corrected to the British standard time of the receiving side on the basis of the area information of the sending side. Therefore, the receiving-side operator is enabled to understand at a glance the order of various pieces of information received from a number of areas, thereby facilitating the time-related management of information.

Further, in reading the E-mail sent from Japan, the receiving-side operator selects the received E-mail by means of a mouse or the like and views the contents of the E-mail as shown in FIG. 23(b). In this instance, before the contents of the E-mail are displayed, the display of the area information is made to enlarge and blink as shown in FIG. 23(a) to inform the receiving-side operator that the E-mail is a mail sent from a different area. After such a display continues for a given time, the actual contents of the E-mail are displayed as shown in FIG. 23(b). Incidentally, the color of the display of the area information may be changed so as to make it easy for the receiving-side operator to recognize the area information.

In the seventh embodiment, what the receiving-side operator can view are a mail address of the sending side, a sending-side area, a subject of the mail, a sending time as corrected to the receiving-side standard time (British standard time in the above case), and contents of the mail.

In this instance, since the sending time which is being displayed on the display picture is the time corrected to the British standard time, "fifteen minutes fifty-seven seconds past twenty-three", which is the sending time information at which the sending-side operator sent the E-mail, is corrected to "fifteen minutes fifty-seven seconds past fifteen".

Further, the sending time in the Japanese standard time can be also displayed as shown in FIG. 23(c) by clicking the time display with a mouse or the like, thereby facilitating the time management of information.

On the other hand, since the second E-mail shown in FIG. 22 is a mail sent from the same area as an area set by the receiving-side world clock, the area information thereof indicates "London".

In displaying the contents of the second E-mail, because of the same area, not only no such special display as to emphasize area information is performed, but also no area information is displayed on an ordinary display picture of the E-mail, as shown in FIG. 23(d). Accordingly, the display picture is simplified, so that an easy-to-view picture can be provided for the operator.

Figure 24:
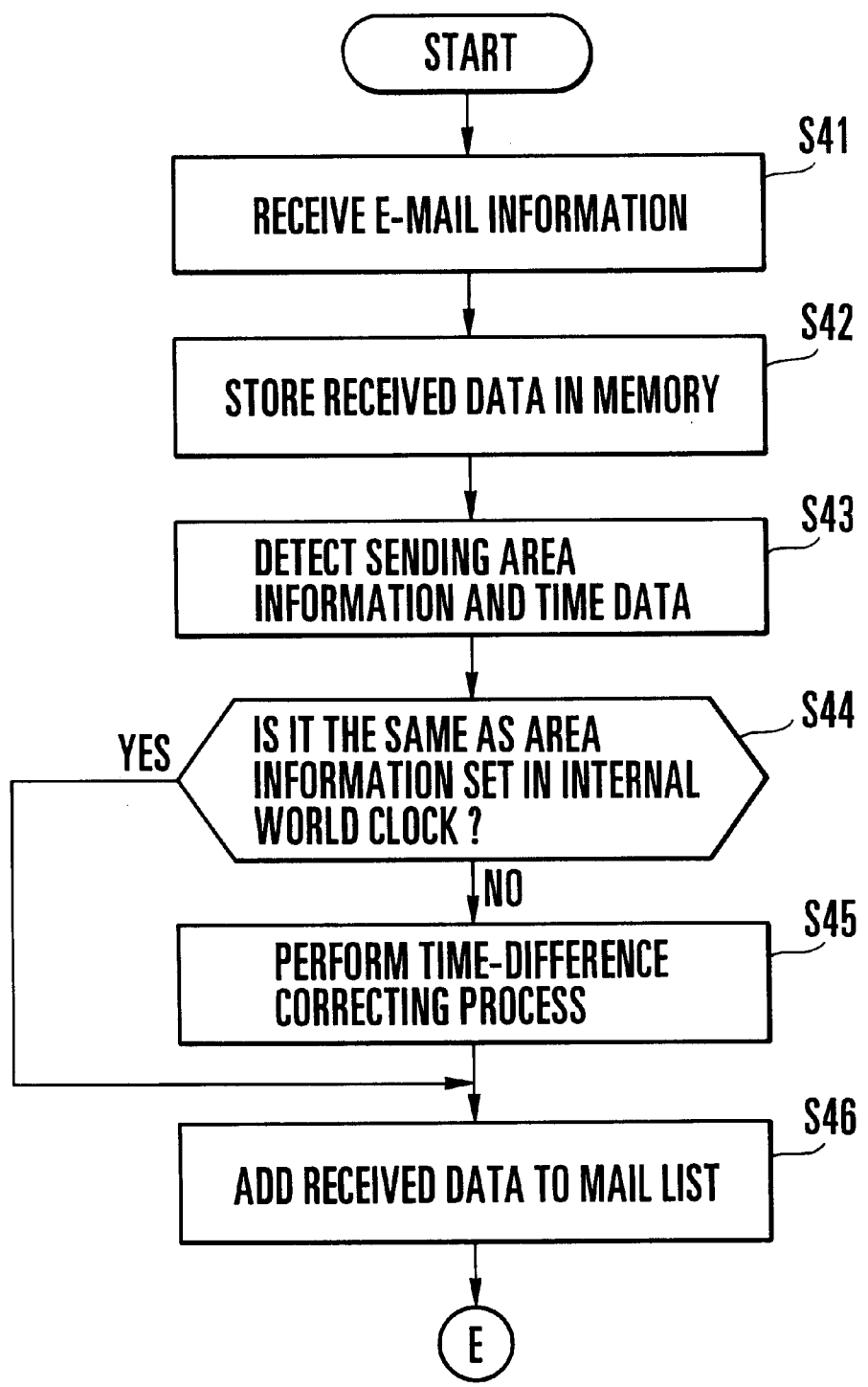
FIG. 24 is a flow chart showing an operation processing procedure of the PDA apparatus according to the seventh embodiment.
Figure 25:
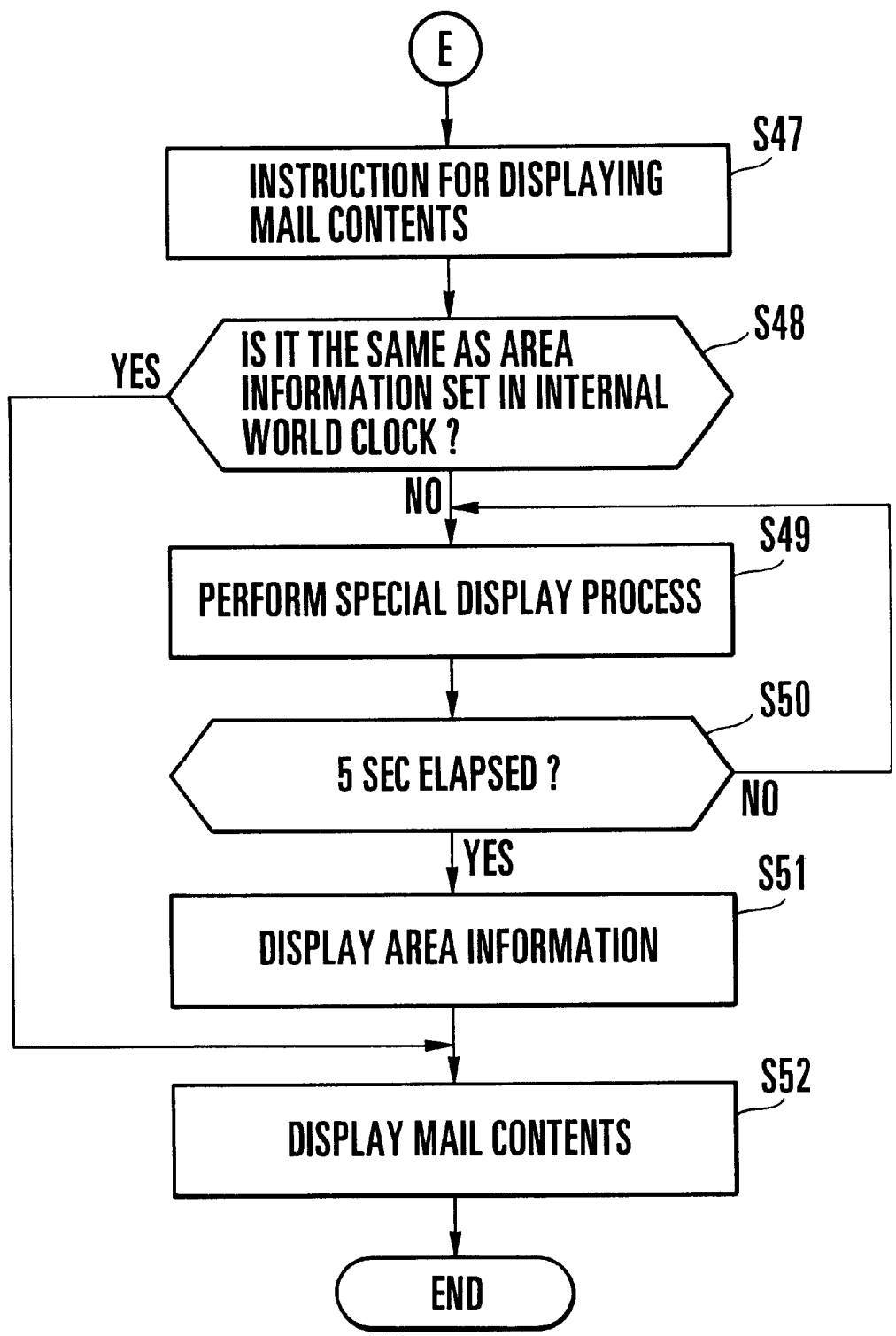
FIG. 25 is a flow chart showing the operation processing procedure of the PDA apparatus according to the seventh embodiment as continued from the flow chart of FIG. 24.

FIGS. 24 and 25 are flow charts showing the operation processing procedure of the PDA apparatus 112 according to the seventh embodiment. A program for the operation processing procedure of the PDA apparatus 112 is stored in a ROM (not shown) included in the system control circuit 113, and is executed by a CPU (not shown) also included in the system control circuit 113.

First, if an electronic mail (E-mail) is received in step S41, data of the received E-mail is stored in a memory in step S42. Then, sending area information and time data are detected from the received data in step S43. In the next step S44, a determination is made to find if the sending area information is the same as area information set in an internal world clock of the system control circuit 113. If not, a time-difference correcting process is performed on the sending time data in step S45. In the next step S46, the received data is added to a mail list. On the other hand, if it is found in step S44 that the sending area information is the same as the area information set in the internal world clock, the received data is added to the mail list as it is, in step S46.

Further, if an instruction for displaying the contents of the received E-mail is issued in step S47, a determination is made in step S48 to find if the sending area information is the same as the area information set in the internal world clock. If not, a special display process is performed in step S49 (see FIG. 23(a)). After the special display process continues five seconds in step S50, the area information is allowed to be displayed in step S51. After that, the display process of the contents of the E-mail is performed in step S52.

On the other hand, if it is found in step S48 that the sending area information is the same as the area information set in the internal world clock, the display process of the contents of the E-mail is performed as it is, in step S52 (see FIG. 23(d)). By the process of step S52, it is possible to make the area information not to be displayed in the contents of the E-mail which has the same area information. Accordingly, it is possible to prevent a picture from becoming complicated.

According to the seventh embodiment, in a case where information sent from an external communication apparatus is received and area information read out from the received information is different from area information which was beforehand set, a time-difference correcting process is applied to time data including a time difference of the received information, so that it is possible to facilitate the time management of each received information. In such a manner, it is possible to automatically perform the time management in information communication between areas having a time difference. In particular, in a case where it is not necessary to inform the operator of area information, a special display or the like can be omitted. Thus, it is possible to improve probability of causing the operator, when reading received information, to recognize that the time-difference correcting process has been performed.

In addition, according to the seventh embodiment, in detecting a sending area, if information of the standard time corresponding to sending time information is missing, all time information and all standard time information are searched and an area corresponding to the standard time which was first added is determined to be the sending area. Further, time information which was added for the first time is determined to be the sending time from the sending area.

The above detecting method is employed because standard time information is sometimes omitted in the case of communication in a domain within one and the same country. Further, since there is a possibility that there exists a domain in which standard time information is not added in any case (for example, a domain of a developing country), the time corresponding to standard time information which was added for the first time may be regarded as the sending time.

Further, the invention may be applied to a system composed of a plurality of apparatuses or to a system consisting of one apparatus. It goes without saying that the invention may be applied to a case where the invention is attained by providing a program to a system or apparatus. In this case, by loading into the system or apparatus a storage medium which stores therein a program represented by software for attaining the invention and reading the program from the storage medium, the system or apparatus becomes able to enjoy the effect of the invention.

FIGS. 26(a), 26(b) and 26(c) are diagrams showing memory maps of ROMs of the system control circuits 104, 109 and 113 in the fifth, sixth and seventh embodiments, respectively. As shown in FIG. 26(a), in the ROM within the system control circuit 104 of the world clock 101, there is stored a group of program modules shown in FIGS. 14 and 15 (an area setting module, an area discriminating module, a special display module, etc.). As shown in FIG. 26(b), in the ROM within the system control circuit 109 of the video camera 106, there is stored a group of program modules shown in FIG. 19 (an information reading module, a time-difference information acquiring module, a special display module, etc.). As shown in FIG. 26(c), in the ROM within the system control circuit 113 of the PDA apparatus 112, there is stored a group of program modules shown in FIGS. 24 and 25 (a receiving module, an information reading module, a time-difference information acquiring module, a correction module, a special display module, etc.).

The storage medium is not limited to a ROM, and may be a floppy disk, a hard disk, an optical disk, a magneto-optical disk, a CD-ROM, a CD-R, a DVD, a magnetic tape, a non-volatile memory card, or the like.

What is claimed is:

1. A reproducing apparatus comprising:
   a reproduction device adapted to reproduce a signal from a recording medium to output the reproduced signal;
   an extraction means adapted to extract clock data included in the reproduced signal;
   an input device adapted to input correction information to perform a time-difference correction; and
   a correction device adapted to perform the time difference correction on the extracted clock data on the basis of the inputted correction information.

2. A reproducing apparatus according to claim 1, wherein the correction information is an area name, and said correction device holds time-difference information corresponding to the area name.

3. A reproducing apparatus according to claim 1, wherein the correction information is a difference in time between areas.

4. A reproducing apparatus according to claim 1, further comprising a display control device adapted to provide a control to cause a display screen to display the time-difference-corrected clock data.

5. A reproducing apparatus according to claim 1, wherein said correction device cancels the time-difference correction by a key operation performed once, to return the clock data to a state obtained before the time-difference correction.

6. A video camera comprising:
   an image pickup device adapted to pick up an object image to output a video signal;
   a clock adapted to generate clock data;
   a recording and reproducing device adapted to record both the video signal and the clock data on a recording medium and reproduce a signal from the recording medium;
   an extraction device adapted to extract the clock data from the signal reproduced from the recording medium;
   an input device adapted to input correction information to perform a time-difference correction; and
   a correction device adapted to perform the time-difference correction on the extracted clock data on the basis of the inputted correction information.

7. A video camera according to claim 6, wherein the correction information is an area name, and said correction device holds time-difference information corresponding to the area name.

8. A video camera according to claim 6, wherein the correction information is a difference in time between areas.

9. A video camera according to claim 7, further comprising a setting device adapted to set clock data in said clock means and for setting an area name indicating which area the set clock data is based on.

10. A video camera according to claim 6, further comprising a display control device adapted to provide a control to cause a display screen to display the time-difference-corrected clock data.

11. A video camera according to claim 6, wherein said correction device cancels the time-difference correction by a key operation performed once, to return the clock data to a state obtained before the time-difference correction.

12. A computer-readable storage medium which stores therein a program for executing a processing comprising:
    a reproduction process of reproducing a signal from a recording medium to output the reproduced signal;
    an extraction process of extracting clock data included in the reproduced signal;
    an input process of inputting correction information for performing a time-difference correction; and
    a correction process of performing the time-difference correction on the extracted clock data on the basis of the inputted correction information.

13. A computer-readable storage medium which stores therein a program for executing a processing comprising:
    an image pickup process of picking up an object image to output a video signal;
    a clock process of generating clock data;
    a recording and reproducing process of recording both the video signal and the clock data on a recording medium and of reproducing a signal from the recording medium;
    an extraction process of extracting the clock data from the signal reproduced from the recording medium;
    an input process of inputting correction information for performing a time-difference correction; and
    a correction process of performing the time-difference correction on the extracted clock data on the basis of the inputted correction information.

14. A computer-readable storage medium according to claim 12, wherein the correction information is an area name, and said correction process holds time-difference information corresponding to the area name.

15. A computer-readable storage medium according to claim 12, wherein the correction information is a difference in time between areas.

16. A computer-readable storage medium according to claim 14, wherein said processing further comprises a setting process of setting clock data in said clock process and of setting an area name indicating which area the set clock data is based on.

17. A computer-readable storage medium according to claim 12, wherein said processing further comprises a display control process of providing a control to cause a display screen to display the time-difference-corrected clock data.

18. A computer-readable storage medium according to claim 12, wherein said processing further comprises a cancellation process of cancelling the time-difference correction by a key operation performed once, to return the clock data to a state obtained before the time-difference correction.

19. An electronic apparatus for displaying time corresponding to an area, comprising:
    a display device adapted to display the time;
    a setting device adapted to set the area; and a reading device adapted to read at least time-difference related information recorded on a recording medium;

wherein said display device displays information concerning an area at which information is recorded on the recording medium, on the basis of the time-difference-related information read by said reading device and information concerning a time difference of the area set by said setting device.

20. An electronic apparatus according to claim 19, wherein, if the time-difference-related information indicates no occurrence of a time difference, said area display device does not display the information concerning the area.

21. A time display method for displaying time corresponding to an area, comprising:

a step of setting the area;

a step of reading at least time-difference-related information recorded on a recording medium; and a step of displaying information concerning an area at which information was recorded on the recording medium, on the basis of the read time-difference-related information and information concerning a time difference of the set area.

22. A storage medium which is adapted to be loaded in an electronic apparatus and which stores therein a program for displaying time corresponding to an area, said program being executed by a central processing unit included in the electronic apparatus and comprising:

a process of setting the area;

a process of reading at least time-difference-related information recorded on a recording medium; and a process of displaying information concerning an area at which information is recorded on the recording medium, on the basis of the read time-difference-related information and information concerning a time difference of the set area.

* * * * *